US012432505B2

(12) United States Patent
Pedersen et al.

(10) Patent No.: US 12,432,505 B2
(45) Date of Patent: Sep. 30, 2025

(54) HEARING SYSTEM COMPRISING A HEARING AID AND AN EXTERNAL PROCESSING DEVICE

(71) Applicant: Oticon A/S, Smoerum (DK)

(72) Inventors: Michael Syskind Pedersen, Smoerum (DK); Jesper Jensen, Smoerum (DK); Nels Hede Rohde, Smoerum (DK); Vasudha Sathyapriyan, Smoerum (DK)

(73) Assignee: Oticon A/S, Smørum (DK)

( * ) Notice: Subject to any disclaimer, the term of this patent is extended or adjusted under 35 U.S.C. 154(b) by 258 days.

(21) Appl. No.: 18/187,715

(22) Filed: Mar. 22, 2023

(65) Prior Publication Data

US 2023/0308817 A1 Sep. 28, 2023

(30) Foreign Application Priority Data

Mar. 25, 2022 (EP) .................................... 22164266

(51) Int. Cl.
*H04R 25/00* (2006.01)

(52) U.S. Cl.
CPC ......... *H04R 25/507* (2013.01); *H04R 25/407* (2013.01); *H04R 2225/43* (2013.01)

(58) Field of Classification Search
CPC ................ H04R 25/507; H04R 25/407; H04R 2225/43; H04R 25/554; H04R 2225/55; H04R 25/558; H04R 2420/07; H04R 25/55; H04R 2499/11

(Continued)

(56) References Cited

U.S. PATENT DOCUMENTS

2011/0176697 A1* 7/2011 Apfel .................. H04R 25/305 381/314
2012/0183165 A1* 7/2012 Foo ......................... G06F 40/58 381/314

(Continued)

FOREIGN PATENT DOCUMENTS

EP 2701145 A1 2/2014
EP 2779685 9/2014

(Continued)

*Primary Examiner* — Norman Yu

(57) ABSTRACT

A hearing system comprises at least one hearing aid (HA) configured to be worn by a user at or in an ear of the user, and an external, portable processing device (EPD). The at least one hearing aid comprises a) at least one HA-input transducer for providing at least one HA-electric input signal representing sound in the environment of the hearing aid; b) a configurable noise reduction system for reducing noise in the at least one HA-electric input signal or in a signal originating therefrom based on a resulting set of noise reduction parameters; c) a noise reduction controller configured to determine a local set of noise reduction parameters; and d) a data receiver configured to receive data via a communication link from the external processing device. The external processing device comprises A) at least one EPD-input transducer for providing at least one EPD-electric input signal representing sound in the environment of the external processing device; B) a parameter estimator for providing an external set of noise reduction parameters configured to reduce noise in the at least one EPD-electric input signal, or in the at least one HA-electric input signal, or in a signal originating therefrom; and C) a data transmitter configured to transmit data, including said external set of noise reduction parameters, via said communication link to the hearing aid. The noise reduction controller is configured to determine said resulting set of noise reduction parameters based on said local set of noise reduction parameters, or on (Continued)

said external set of noise reduction parameters, or on a mixture thereof, in dependence of a noise reduction control signal. A hearing aid and a method of operating a hearing system is further disclosed.

21 Claims, 11 Drawing Sheets

(58) Field of Classification Search
USPC ......... 381/315, 314, 312, 323, 74, 311, 370, 381/334
See application file for complete search history.

(56) References Cited

U.S. PATENT DOCUMENTS

| | | | | |
|---|---|---|---|---|
| 2014/0105412 | A1* | 4/2014 | Alves | G10K 11/17885 381/71.6 |
| 2014/0211972 | A1* | 7/2014 | Kim | H04R 25/70 381/314 |
| 2017/0325016 | A1* | 11/2017 | Lee | H04R 1/1041 |
| 2019/0222943 | A1* | 7/2019 | Andersen | G10L 21/0364 |
| 2021/0223577 | A1* | 7/2021 | Zhang | H04R 1/24 |

FOREIGN PATENT DOCUMENTS

| | | | |
|---|---|---|---|
| EP | 3252766 | A1 | 12/2017 |
| EP | 3253075 | A1 | 12/2017 |
| EP | 3255902 | A1 | 12/2017 |
| EP | 3694229 | A1 | 8/2020 |
| EP | 4099724 | A1 | 12/2022 |
| WO | WO2021/089176 | | 5/2021 |

* cited by examiner

HEARING SYSTEM COMPRISING A HEARING AID AND AN EXTERNAL PROCESSING DEVICE

TECHNICAL FIELD

Noise reduction in hearing aids has its limitations due to the limited computational power. The limited space and battery power in a hearing aid prevents computationally demanding algorithms, such as noise reduction based on large deep neural networks (DNN), or the like, to be executed. In most situations, the hearing aids cope well but in a small fraction of acoustic environments, noise reduction exceeding the capabilities of the hearing aid is needed.

In such situations, computational capabilities from another device could be used, e.g. a dedicated external processing device or a phone.

One problem of using an external device is the transmission delay. Transmitting audio from the hearing aid microphones to the external device, enhancing the signal, and transmitting the enhanced signal back to the hearing aid all takes time. Preferably, it should take less than ten milliseconds (ms) from the sound reaches the microphone until it reaches the ear. Even if an externally enhanced audio signal is transmitted to the hearing instrument, it may cost additional delay, if e.g. the enhanced signal requires further processing in order to compensate for the hearing loss and integrate the external sound with the local hearing aid microphone signals.

SUMMARY

A Hearing System:

In an aspect of the present application, a hearing system comprising at least one hearing aid (HA) configured to be worn by a user at or in an ear of the user, and an external, portable processing device (EPD) is provided.

The at least one hearing aid comprises

- at least one HA-input transducer for providing at least one HA-electric input signal representing sound in the environment of the hearing aid (HA);
  - a configurable noise reduction system for reducing noise in the at least one HA-electric input signal or in a signal originating therefrom based on a resulting set of noise reduction parameters;
  - a noise reduction controller configured to determine a local set of noise reduction parameters;
  - a data receiver configured to receive data via a communication link from the external processing device.

The external processing device comprises

- at least one EPD-input transducer for providing at least one EPD-electric input signal representing sound in the environment of the external processing device (EPD);
- a parameter estimator for providing an external set of noise reduction parameters configured to reduce noise in the at least one EPD-electric input signal, or in the at least one HA-electric input signal, or in a signal originating therefrom; and
- a data transmitter configured to transmit data, including said external set of noise reduction parameters, via said communication link to the hearing aid.

The noise reduction controller may be configured to determine the resulting set of noise reduction parameters based on a) the local set of noise reduction parameters, or b) on the external set of noise reduction parameters, or c) on a mixture thereof, in dependence of a noise reduction control signal.

Thereby an improved hearing system may be provided.

A hearing system according to the present disclosure may have the advantage that when extra noise reduction is needed, a set of noise reduction parameters (e.g. a gain (or gains, possibly varying across time and frequency)) can be transmitted from the external processing device to the hearing aid. Even though the noise reduction parameters (e.g. gains) are estimated externally, it may (at least in certain situations) be assumed that the signal of interest (e.g. a target speech signal) will occupy more or less the same time frequency units at the local hearing aid microphones (as the external noise reduction parameters, e.g. gains, cf. e.g. FIG. 7A, 7B). Hence, a gain estimated from an external processing device (e.g. a microphone unit), e.g. located at the user's chest, is thus also valid for speech enhancement when applied to a signal based on a local hearing aid microphone.

The terms 'HA-input transducer' and 'HA-electric input signal' and 'EPD-input transducer' and 'EPD-electric input signal' are intended to be short for 'hearing aid input transducer' and 'hearing aid electric input signal' and 'external processing device input transducer' and 'external processing device electric input signal', respectively. The use of the abbreviations in the claims is intended to easily differentiate a reference to the input transducers and the electric input signals of the hearing aid (HA) from the input transducers and the electric input signals of the external processing device (EPD).

The terms 'hearing aid' and 'hearing instrument' are used interchangeably in the present disclosure without any intended difference in meaning.

The term 'noise reduction parameters' is intended to include voice activity parameters, e.g. for controlling the update of a beamformer, or signal to noise ratios (or similar 'signal quality parameters'), e.g. for controlling a post-filter.

- A) The local set of noise reduction parameters (e.g. locally estimated noise reduction gains) may be computationally easy to estimate, cf. e.g. prior art solutions in EP3252766A1 or EP3694229A1.
- B) The external set of noise reduction parameters may be estimated using more computational power (due to the typically larger size and battery power than the hearing aid), e.g. based on
- b1. More microphones
- b2. A much larger, deep neural network compared to what is feasible in the local estimation.
- C) If the noise reduction control system (e.g. represented by the noise reduction control signal) allows that the external noise reduction parameters (e.g. NR gain) to be utilized, it may replace the local noise reduction parameters or it may be combined, e.g. either using the maximum or the minimum value when comparing the local and the external NR parameters (e.g. gain estimates).

The hearing system, e.g. the noise reduction system of the hearing aid, may comprise a beamformer for providing a spatially filtered (beamformed) signal in dependence of a multitude of electric input signals (from respective (acousto-electric) input transducers) and fixed or adaptively updated (generally complex) beamformer weights applied to the multitude of electric input signals, e.g. using a voice activity detector.

The hearing system, e.g. the noise reduction system of the hearing aid, may comprise a post-filter receiving the beamformed signal and being configured to further reduce noise in the beamformed signal in dependence of (adaptively determined) post-filter gains. The post-filter gains may e.g. be determined in dependence of the outputs of one or more target-cancelling beamformers, whose beamformer weights are e.g. fixed or updated during use, e.g. using a voice activity detector.

The (external) set of noise reduction parameters (e.g. gain estimates) may thus be configured to reduce noise in the at least one EPD-electric input signal, or in the at least one HA electric input signal, or in a signal originating therefrom, when the noise reduction parameters (e.g. gain estimates) are applied to the respective signal or signals.

The hearing system may be configured to transmit the external set of noise reduction parameters (e.g. gain estimates) to the hearing aid via the communication link. The transmitter of the external processing device may be configured to continuously transmit the external set of noise reduction parameters from the external processing device to the hearing aid. The transmitter of the external processing device may be configured to transmit the external set of noise reduction parameters from the external processing device to the hearing aid in dependence of a transmit control signal.

The hearing system may be configured to provide that only a subset of the sub-bands are transmitted from the external processing device to the hearing aid(s), e.g. the sub-bands corresponding to frequencies below 3000 Hz, or frequencies below 2000 Hz, or frequencies below 1000 Hz.

The hearing system (e.g. the hearing aid and/or the external processing device) may e.g. comprise a signal quality estimator configured to estimate a signal quality parameter, of the at least one EPD-electric input signal, and/or of the at least one HA-electric input signal, or of a signal originating therefrom. Separate signal quality estimators may be located in the hearing aid and in the external processing device, respectively. The signal quality parameters provided by the (possibly) separate signal quality estimators may be compared in a comparator. The comparator may be configured to provide the noise reduction control signal.

The external set of noise reduction parameters received in the hearing aid from the external processing device may be integrated (e.g. mixed, e.g. as a weighted combination) with a local set of noise reduction parameters determined in the hearing aid. In case no noise reduction parameters (e.g. gain estimates) are received in the hearing aid from the external processing device (e.g. because the external processing device is out of range (or off), or that transmission is not enabled), the noise reduction controller may be configured to determine the resulting set of noise reduction parameters solely in dependence of the local set of noise reduction parameters determined in the hearing aid. In other words, in such case the noise reduction control signal may be adapted to indicate to the noise reduction controller to (only) base the resulting set of noise reduction parameters on the local set of noise reduction parameters.

In general, the noise reduction control signal may be adapted to indicate to the noise reduction controller (e.g. to a decision unit, forming part of the noise reduction controller) A) to only base the resulting set of noise reduction parameters on the local set of noise reduction parameters, or B) to only base the resulting set of noise reduction parameters on the external set of noise reduction parameters, or C) to base the resulting set of noise reduction parameters on a mixture (e.g. as a weighted combination) of the local set of noise reduction parameters and the external set of noise reduction parameters. The weights of a given weighted combination may be frequency dependent and may depend on the respective signal quality parameters (SQE-L, SQE-X) of the at least one HA-electric input signal and the at least one EPD-electric input signal. $RG(k)=LG(k)W_{HA}(k)+XG^*(k)W_{EPD}(k)$, where the individual (e.g. frequency dependent) weights $W_{HA}(k)$ and $W_{EPD}(k)$ of the hearing aid and the external processing device may be adapted to scale with their signal quality parameters $SQP_{HA}(k)$ (=SQE-L) and $SQP_{EPD}(k)$ (=SQE-X), respectively ('scale with' in the meaning 'larger the larger' and 'smaller the smaller').

The external set of noise reduction parameters received from the external processing device may be combined (or mixed) with the local set of noise reduction parameters (e.g. gain estimates) based on the at least one HA-electric signal, or a signal or signals originating therefrom (e.g. controlled in a decision unit, by the noise reduction control signal).

A combination (or mixing) of noise reduction parameters may e.g. be based on a maximum or a minimum operator (e.g. selecting a maximum or minimum of the respective values, e.g. on a frequency sub-band level). The combination may as well be a weighted sum of the (corresponding) noise reduction parameters and/or may be combined using a neural network, e.g. located in the hearing aid.

The hearing aid may comprise an output transducer, e.g. a loudspeaker of an air-conduction type hearing aid, a vibrator of a bone conduction type hearing aid, or a multi-electrode array of a cochlear implant type hearing aid.

The hearing aid may comprise a processor for applying one of or more processing algorithms, e.g. for compensating for a hearing impairment of the user (e.g. including a compressor for adapting a dynamic range of input levels to the needs of the user).

The hearing system may be configured to estimate a signal quality parameter, of the at least one EPD-electric input signal, or of the at least one HA-electric input signal, or of a signal originating therefrom. The signal quality parameter may e.g. comprise a signal to noise ratio (SNR), or a level, a voice activity parameter (e.g. a speech presence probability (SPP)), or a bit error rate, or similar (equivalent) parameters (e.g. a distance between the hearing aid and the external processing device, e.g. represented by a physical distance, or a transmission link quality parameter of a wireless link between the two devices (e.g. a bit error rate of a received signal, or a signal strength of the wireless link, or an acoustic propagation delay (optionally including an associated processing delay), etc.). The signal quality parameter may e.g. relate to estimating if the input signal quality or the noise reduction quality is acceptable. If e.g. the external device is too far (e.g. ≥a threshold distance, e.g. ≥1.5 m) from the hearing aid(s), the noise reduction parameters (e.g. a noise reduction gain pattern) may start to deviate from the optimal gain pattern at the local microphones).

The noise reduction control signal may depend on the estimated delay between the local set of noise reduction parameters (e.g. locally estimated gains) and the external set of noise reduction parameters (e.g. externally estimated gains). The noise reduction control signal (e.g. based on noise reduction delay or distance) may be estimated in dependence of a correlation measure between the gain envelopes. The hearing aid (e.g. via the noise reduction control signal) may be configured to only take the external set of noise reduction parameters (e.g. external gains) into account, when the latency (delay)/distance between the external processing device and the hearing aid is smaller than a certain threshold.

The hearing system may be configured to determine the noise reduction control signal in dependence of the signal quality parameter of the at least one EPD-electric input signal, and/or of the at least one HA-electric input signal, or in a signal originating therefrom.

The hearing aid may be configured to detect whether said external set of noise reduction parameters are received in the hearing aid from the external processing device, and to provide a reception control signal representative thereof. Thereby the hearing aid may be configured to use the local set of noise reduction parameters as the resulting set of noise reduction parameters in case it is detected that no external set of noise reduction parameters are received from the external processing device. In other words, the noise reduction control signal may be dependent on the reception control signal.

The hearing system may comprise a sound scene classifier for classifying an acoustic environment around the hearing system and providing a sound scene classification signal representative of a current acoustic environment around the hearing system. The sound scene classifier may be configured to provide a sound scene classification signal representative of the current acoustic environment around the hearing system (e.g. its complexity for a hearing impaired person). The hearing system may (alternatively or additionally) be configured to receive a sound scene classification signal (representative of an acoustic environment around the hearing system) from a device or system in communication with the hearing system. The sound scene classifier may form part of the hearing aid. The sound scene classifier may form part of the external processing device. The (or a) sound scene classifier may be located in (and/or the sound scene classification signal may be available in) the hearing aid as well as in the external processing device.

The sound scene classifier may be configured to classify the current acoustic environment around the hearing system according to its complexity for a hearing impaired person, e.g. for the user of the hearing system. The sound scene classification signal may be representative of an estimate of the complexity of the current sound scene. The complexity of the current sound scene may e.g. be dependent on a signal to noise ratio of a signal from a microphone of the hearing system. The current sound scene may be defined as complex, when the signal to noise ratio is smaller than a threshold value (e.g. −5 dB). The complexity of the current sound scene may e.g. be dependent on a noise level of a signal from a microphone of the hearing system. The current sound scene may be defined as complex, when the noise level is larger than a threshold value (e.g. 60 dB). The threshold may e.g. depend on the hearing loss of the user. The complexity of the current sound scene may e.g. be dependent on the number of simultaneous speakers (e.g. extracted from of a signal or signals from a microphone or microphones of the hearing system). The current sound scene may be defined as complex, when the number of simultaneous speakers is larger than a threshold value (e.g. 2 or 3).

The signal quality estimator may form part of or be constituted by the sound scene classifier.

In general (wireless) communication between portable devices is relatively energy intensive (considering the total energy capacity of the system, in this case, especially of the hearing aid).

The hearing system may be configured to control the communication link to allow enabling/disabling the transmission of data by the external processing device, or reception of data by the hearing aid, in dependence of a link control signal.

The hearing system may be configured to control the communication link in dependence of the sound scene classification signal. The link control signal may be dependent on (or equal to) the sound scene classification signal. The external processing device may be configured to enable transmission of data to the hearing aid in dependence of the sound scene classification signal, e.g. when the sound scene classification signal represents a complex sound scene. Hence, only if the sound scene is estimated to be complex, the hearing aid may receive data from the external device (including the external set of noise reduction parameters).

The sound scene classifier (estimating the complexity of the current sound scene) may e.g. be located in the external processing device, hereby only enabling data transmission (to the hearing aid), if the sound scene is estimated to be complex. Alternatively, the sound scene classifier (estimating the complexity of the current sound scene) may be located in the hearing aid, hereby only allowing the data receiver to be enabled in complex sound scenes (e.g. even though the external processing device transmits data, the hearing aid only receives data, if considered necessary).

The parameter estimator of the external processing device may comprise a deep neural network. The parameter estimator may comprise at least one deep neural network (DNN). Different DNNs may be provided for different parameters. In that case, the different DNNs may share some input layers. The number of nodes of the input layer of the deep neural network may be larger than 64 or 128 or 256. The number of nodes may be even larger, depending on the number of stacked frames and the number of microphones. The deep neural network comprises an input layer, a number of hidden layers, and an output layer. The number of hidden layers may be larger than two or larger than ten, e.g. between two and ten. The number of nodes of the hidden layers may A) be larger than or equal to the number of nodes of the input layer, or B) it may be smaller than or equal to the number of nodes of the input layer. The deep neural network may e.g. be configured to provide that the number of nodes (the width) of the hidden layers increase (A) or decrease (B) in the first half of the network, and subsequently decrease (A) or increase (B) in the second half. The input vector to the input layer may comprise one or more frames of the at least one EPD-electric input signals, or a signal originating therefrom (e.g. a spatially filtered signal provided in dependence of the at least one EPD-electric input signals), or characteristic features extracted from the signals (e.g. levels or magnitudes). The output vector may comprise the noise reduction parameters, e.g. gain estimates, SNR, voice activity, etc., determined for a given input vector, e.g. frequency dependent gains (etc.) determined in a number of frequency sub-bands (e.g. K, or a subset thereof).

The structure of the neural network may be of any type, including convolutional networks, recurrent networks, such as long short-term memory networks (LSTMs), or or a gated recurrent unit (GRU), or a modification thereof, etc. The neural network may e.g. contain convolutional layers, recursive layers or fully-connected layers.

The deep neural network may be trained to provide an ideal target gain, i.e. the noise reduction parameters (e.g. gain estimates), based on a signal or signals picked up by the at least one EPD input transducer of the external processing device, or the at least one HA input transducer of the at least one hearing aid, or a combination thereof. The deep neural network may alternatively or additionally be trained to estimate a voice activity or signal to noise ratios. The ground truth noise reduction parameters (e.g. gain estimates, or voice activity estimates or SNR-estimates) may e.g. be based on one or both of the hearing aids of a binaural hearing system or based on a combination of all available input transducers (e.g. microphones).

The hearing system may be configured to provide a limitation on the noise reduction parameters (e.g. noise reduction gains) applied to the at least one HA electric input signal or to a signal originating therefrom by the noise reduction system of the hearing aid. As the noise reduction parameters (e.g. gains) estimated in an external processing device may possibly remove noise completely (which may be unintended), the hearing aid may limit the maximum amount of noise reduction. The maximum amount of attenuation may depend on the complexity of the acoustic environment (e.g. represented by the sound scene classification signal, or the signal quality parameter), e.g. at low input levels or at high SNR, it may not be necessary to remove noise.

The noise reduction parameters, e.g. gains, may e.g. be saturated at a maximum attenuation. A maximum attenuation may be estimated based on the sound environment. A maximum attenuation may e.g. be a function of the sound level or of the estimated signal to noise ratio. A maximum attenuation will limit the amount of attenuation in the noise reduction parameters received from the external device (or determined locally). The maximum attenuation may e.g. be 0 dB in easy (non-complex) environments, where no noise reduction is needed. In more difficult (complex) environments, the maximum attenuation may e.g. be ≥10 dB, ≥20 dB or even ≥40 dB. For own voice processing, the maximum attenuation may be higher than the maximum attenuation applied to ambient noise. The maximum amount of noise reduction may depend on the sound scene classification signal.

A (or the) sound scene classifier may be implemented in the external processing device, and information on the sound scene, e.g. the sound scene classification signal, is transmitted to the hearing device(s).

The hearing system may comprise a distance estimator (or a delay estimator) configured to estimate a distance (or delay) between the at least one hearing aid and the external processing device. In a setup, where the transmission from the external processing device to the hearing aid is monodirectional (i.e. no transmission of data from hearing aid to external processing device), it may be necessary to determine if the external processing device is sufficiently close to the hearing aid (otherwise the estimated time-frequency gain from the external processing device may be misaligned with the local microphone signals). If the microphones of the hearing device(s) are close to the microphones of the external processing device, such as closer than a threshold value, e.g. 30 centimetres (0.3 m), or 1 m, it is expected that the received audio signals are highly correlated, with a time of arrival difference less than one millisecond. Correlation may be higher at lower frequencies than higher frequencies. A distance between the at least one hearing aid and the external processing device may be estimated based on a received signal strength at the data receiver of the hearing aid (e.g. using information about the transmitted signal strength from the data transmitter of the external processing device).

The distance estimator (or the delay estimator) may be configured to estimate the distance (or delay) between the at least one hearing aid and the external processing device in dependence of a correlation between an envelope of the noise reduction parameters provided by the external processing device and an envelope of the at least one HA electric input signal or of a signal originating therefrom. As the envelope of the received gain pattern is well correlated with the local microphone signal, we may determine the time lag (e.g. delay) between the received gain pattern and the local microphone signal (or a signal derived from the local microphone signals, such as an envelope signal). FIG. 7A, 7B may illustrate a low-passed version of the signals' envelope. In particular the upper part of FIG. 8 shows envelopes in a particular frequency band.

The noise reduction controller may be configured to only apply the noise reduction gain estimates provided by the external processing device if a time lag between the respective envelopes is smaller than a threshold-value. The (possibly pre-determined) threshold value may e.g. be smaller than or equal to 2 ms, such as smaller than or equal to 1 ms.

The parameter estimator of the external processing device may be configured to estimate external sets of noise reduction parameters of a multitude of audio signals from a corresponding multitude of sound sources and to transmit separate external sets of noise reduction parameters for said multitude of simultaneous audio signals simultaneously to said at least one hearing aid. The multitude of sound sources may e.g. originate from a corresponding multitude of (simultaneous or sequential) talkers. The external processing device may be configured to separate a multitude of simultaneous talkers and provide a corresponding multitude of audio streams, and to transmit a corresponding multitude of external sets of noise reduction parameters (e.g. noise reduction gain estimates) belonging to each separate audio stream to the at least one hearing aid. The external processing device may be able to transmit a separate external set of noise reduction parameters for the user's own voice.

The at least one hearing aid may comprise first and second hearing aids adapted for being located at or in left and right ears, respectively, of the user, wherein the external processing device is configured to provide separate first and second external sets of noise reduction parameters for the first and second hearing aids, and to transmit said first and second external sets of noise reduction parameters from the external device to said first and second hearing aids, respectively. The first and second external sets of noise reduction parameters may both be transmitted from the external device to said first and second hearing aids, respectively. The first and second hearing aids (e.g. the respective noise reduction controllers) may be configured to select the appropriate one of the first and second external sets of noise reduction parameters for use in the hearing aid in question (e.g. based on (e.g. predefined) identity information or (e.g. predefined or adaptively determined) location information of the hearing aid in question).

The external processing device may comprise a voice activity detector for estimating whether or not, or with what probability, an input signal comprises speech at a given point in time, and to provide a voice activity control signal in dependence thereof. The voice activity detector may be configured to operate on band split signals ((time-) frequency domain). The voice activity control signal may be provided in the (time-) frequency domain (in a time-frequency representation k, l, where k and l are frequency and time indices respectively).

The at least one hearing aid and/or the external processing device may comprise a directional microphone system adapted to spatially filter sounds from the environment, and thereby enhance a target acoustic source among a multitude of acoustic sources in the local environment around the hearing system. The external processing device may be configured to transmit the voice activity control signal to the hearing aid or hearing aids of the hearing system for being used there.

The directional system may comprise an adaptive beamformer, e.g. an MVDR beamformer, an LCMV beamformer or a generalized eigenvector (GEV) beamformer, and wherein the adaptive beamformer is based on estimates of target covariance and/or noise covariance matrix estimates.

The hearing system may be configured to provide that the externally estimated voice activity control signal is used in the at least one hearing aid to update one or more covariance matrices.

Target and noise covariance matrices may be updated based on a voice activity estimator determining whether a time-frequency tile is mainly dominated by speech or by noise. A voice activity estimate may be provided by the external processing device or estimated in combination with the local microphones and the external processing device.

The external processing device is configured to be worn or carried by the user or a target talker, and/or to be placed on a surface, e.g. a table. The external processing device may be configured to be worn by a person, e.g. the user or a target talker, e.g. a communication partner. The external processing device may further be configured to be located on a table or similar structure, e.g. to pick up sound from sound sources near the table.

The at least one hearing aid may be constituted by or comprises an air-conduction type hearing aid, a bone-conduction type hearing aid, a cochlear implant type hearing aid, or a combination thereof.

The external processing device may comprise a remote control, a smartphone, or other portable or wearable electronic processing device, e.g. a dedicated processing device for the hearing aid(s) of the hearing system.

The external processing device may be constituted by or comprise a remote control for controlling functionality and operation of the hearing aid(s). The function of a remote control may be implemented by the external processing device possibly running an APP allowing to control the functionality of the hearing system (external processing device and hearing aid(s)). The external processing device and hearing aid(s)) comprises an appropriate wireless interface, e.g. based on Bluetooth or some other standardized or proprietary scheme, allowing exchange of data between them (at least from the external processing device to the hearing aid(s)).

A Hearing Aid:

In an aspect of the present disclosure, a hearing aid (HA) configured to be worn by a user at or in an ear of the user, is furthermore provided. The hearing aid comprises

- at least one input transducer, termed a HA-input transducer, for providing at least one electric input signal, termed a HA-electric input signal, representing sound in the environment of the hearing aid;
- a configurable noise reduction system for reducing noise in the at least one HA-electric input signal or in a signal originating therefrom based on a resulting set of noise reduction parameters, said resulting noise reduction parameters being determined in dependence of a noise reduction control signal;
- a noise reduction controller configured to determine a local set of noise reduction parameters; and
- a receiver configured to receive data via a communication link from an external processing device, including an external set of noise reduction parameters.

The noise reduction controller may be configured to determine a resulting set of noise reduction parameters based on said local set of noise reduction parameter, or on said external set of noise reduction parameters, or on a mixture thereof in dependence of a noise reduction control signal.

The local hearing aid may comprise a controllable ventilation channel configured to allow adjustment of its effective cross-sectional area in dependence of a current acoustic environment (e.g. to decrease its cross section (or even close) in the more difficult the listening situation is, thereby reducing the ambient sounds/noise entering through the vent).

One or more external microphone signals may be transmitted from the external processing device to the local hearing aid to form an M-microphone beamformer (M>1). This would increase the effectiveness of the noise reduction system at the cost of power used both at the external processing device and the local hearing aids.

Instead of only having two degrees of complexity of the current sound scene (normal, difficult), e.g. provided by a sound scene classifier, we could have more than two (e.g. easy, normal, hard, very hard, etc.), each degree of complexity being associated with a specific processing scheme of the hearing system, for example:

Easy: no external processing

Normal: external processing (gain estimation)

Hard: Normal+closing up vent

Very hard: Hard+transmitting signal signal to form a M-mic beamformer

Etc.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid and/or the external processing device may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

Most sound signal sources (except the user's own voice) are located far way from the user compared to dimensions of the hearing aid, e.g. a distance $d_{mic}$ between two microphones of a directional system. A typical microphone distance in a hearing aid is of the order 10 mm. A minimum distance of a sound source of interest to the user (e.g. sound from the user's mouth or sound from an audio delivery device) is of the order of 0.1 m ($\approx$10 $d_{mic}$). For such minimum distances, the hearing aid (microphones) would be in the acoustic near-field of the sound source and a difference in level of the sound signals impinging on respective microphones may be significant. A typical distance for a communication partner is more than 1 m (>100 $d_{mic}$). The hearing aid (microphones) would be in the acoustic far-field of the sound source and a difference in level of the sound signals impinging on respective microphones is insignificant.

The difference in time of arrival of sound impinging in the direction of the microphone axis (e.g. the front or back of a normal hearing aid) is $\Delta T = d_{mic}/v_{sound} = 0.01/343$ [s]=29 µs, where $v_{sound}$ is the speed of sound in air at 20° C. (343 m/s).

The hearing aid may comprise antenna and transceiver circuitry allowing a wireless link to an entertainment device (e.g. a TV-set), a communication device (e.g. a telephone), a dedicated external processing device, a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, e.g. less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_u$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry, and/or the external processing unit may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range (representing time varying frequency sub-band signals). The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g.

a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode, or an enhanced processing mode. A mode of operation may include a low-power mode, where functionality of the hearing aid is reduced (e.g. to save power), e.g. to disable wireless communication, and/or to disable specific features of the hearing aid. The enhanced processing mode, may be a node of operation wherein enhanced processing is provided by an external processing device in communication with the hearing aid (or a pair of hearing aids of a binaural hearing aid system).

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid, e.g. the external processing device. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector may be configured to operate on the full band signal (time domain). The level detector may be configured to operate on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid or the external processing device may comprise a classification unit (e.g. denoted 'sound scene classifier') configured to classify the current (acoustic) situation, e.g. based on input signals from one or more of the detectors, and possibly other inputs as well.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

A Method:

In an aspect of the present disclosure, a method of operating a hearing system comprising at least one hearing aid (HA) configured to be worn by a user at or in an ear of the user, and an external, portable processing device, is furthermore provided. The method comprises

- in the at least one hearing aid
  - providing at least one HA-electric input signal representing sound in the environment of the hearing aid (HA);
  - reducing noise in the at least one HA-electric input signal or in a signal originating therefrom based on a resulting set of noise reduction parameters;
  - determining a local set of noise reduction parameters;
  - receiving data via a communication link from the external processing device;
- in the external processing device
  - providing at least one EPD-electric input signal representing sound in the environment of the external processing device (EPD);
  - providing an external set of noise reduction parameters configured to reduce noise in the at least one EPD-electric input signal, or in the at least one HA-electric input signal, or in a signal originating therefrom;
  - transmitting data, including said external set of noise reduction parameters, via said communication link to the hearing aid.

The method may further comprise determining said resulting set of noise reduction parameters based on said local set of noise reduction parameters, or on said external set of noise reduction parameters, or on a mixture thereof, in dependence of a noise reduction control signal.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid (e.g. the external processing device) or said hearing system.

Embodiments of the disclosure may e.g. be useful in applications such as hearing aids or headsets or similar small size wearable listening or communication devices.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, embedded software, firmware, middleware, microcode, hardware description language, or otherwise.

The present application relates to the field of hearing aids. The disclosure particularly deals with the handling of computationally demanding tasks, e.g. related to noise reduction, e.g. handled by machine learning techniques, such as deep neural networks.

Figure 1:
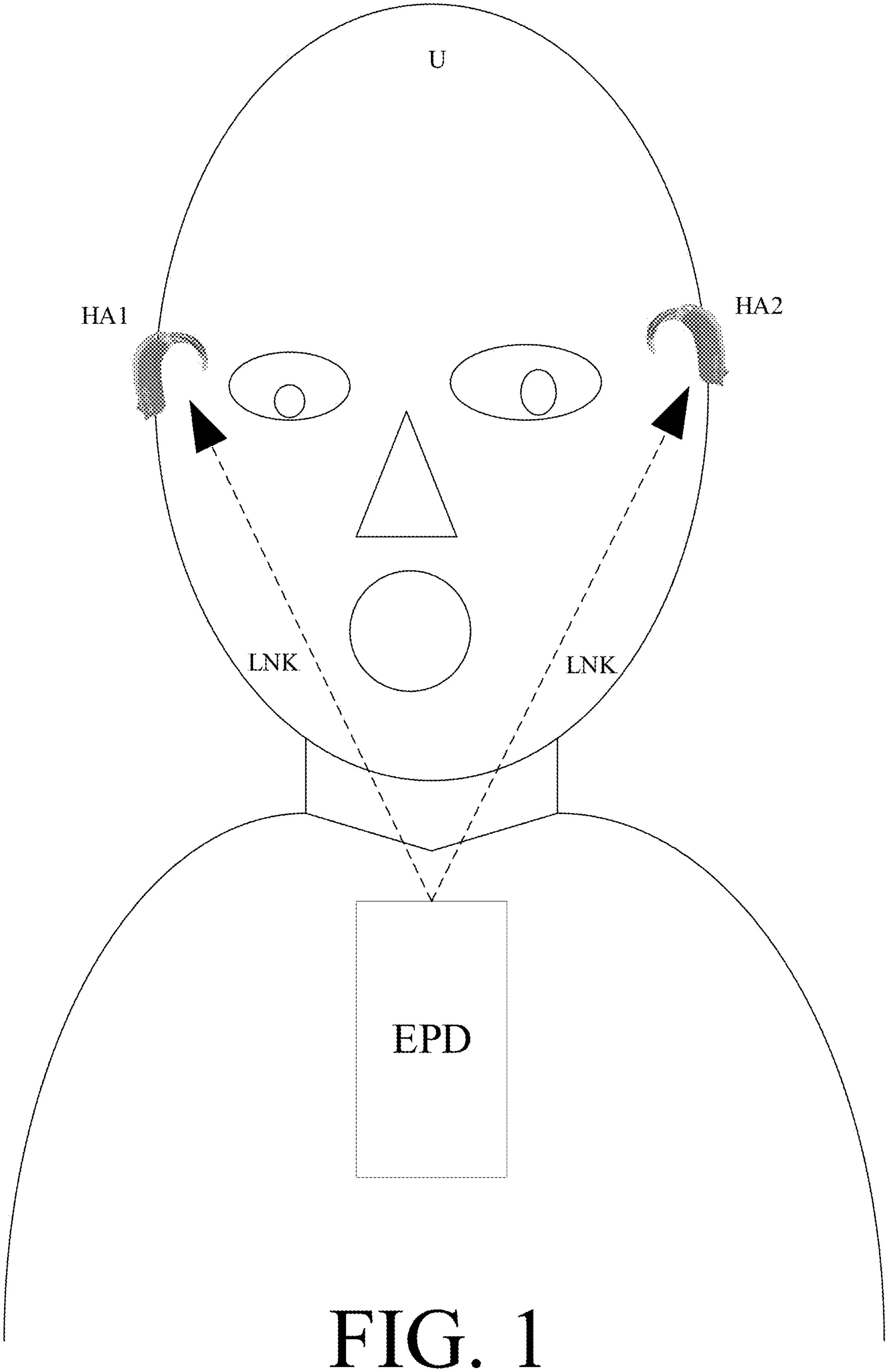
FIG. 1 shows an embodiment of hearing system according to the present disclosure.

A setup as illustrated in FIG. 1 is proposed. FIG. 1 shows an embodiment of hearing system according to the present disclosure. The hearing system comprises a hearing aid (here a pair of hearing instruments (HA1, HA2)) and an external processing device (EPD). The hearing instruments (HA1, HA2) are configured to be worn at left and right ears of a user (U). In the case where extra (e.g. computational) help (e.g. extra noise reduction) is needed, the hearing aid user (U) can turn on an external processing device, e.g. attached to his clothes, kept in a pocket, etc. The external device, here termed 'the external processing device' (EPD), may contain one or more microphones, a signal processor and a transmitter (and possibly also a receiver). When the external processing device is turned on, it preferably transmits an estimated gain (possibly varying across time and frequency) to the hearing instrument(s), which enhances or maintains time-frequency units in which a desired speech signal is present and attenuates time-frequency units where noise is dominant. The gain may be estimated based on the microphones in the external processing device (EPD). It is assumed that the time frequency units which are dominated by speech as well as noise at the external microphone will be similar to the time-frequency units dominated by speech and noise received in the hearing instruments (HA1, HA2). We thus assume that the estimated gain provided by the external processing device can be applied to the hearing aid microphones as well.

Figure 2:
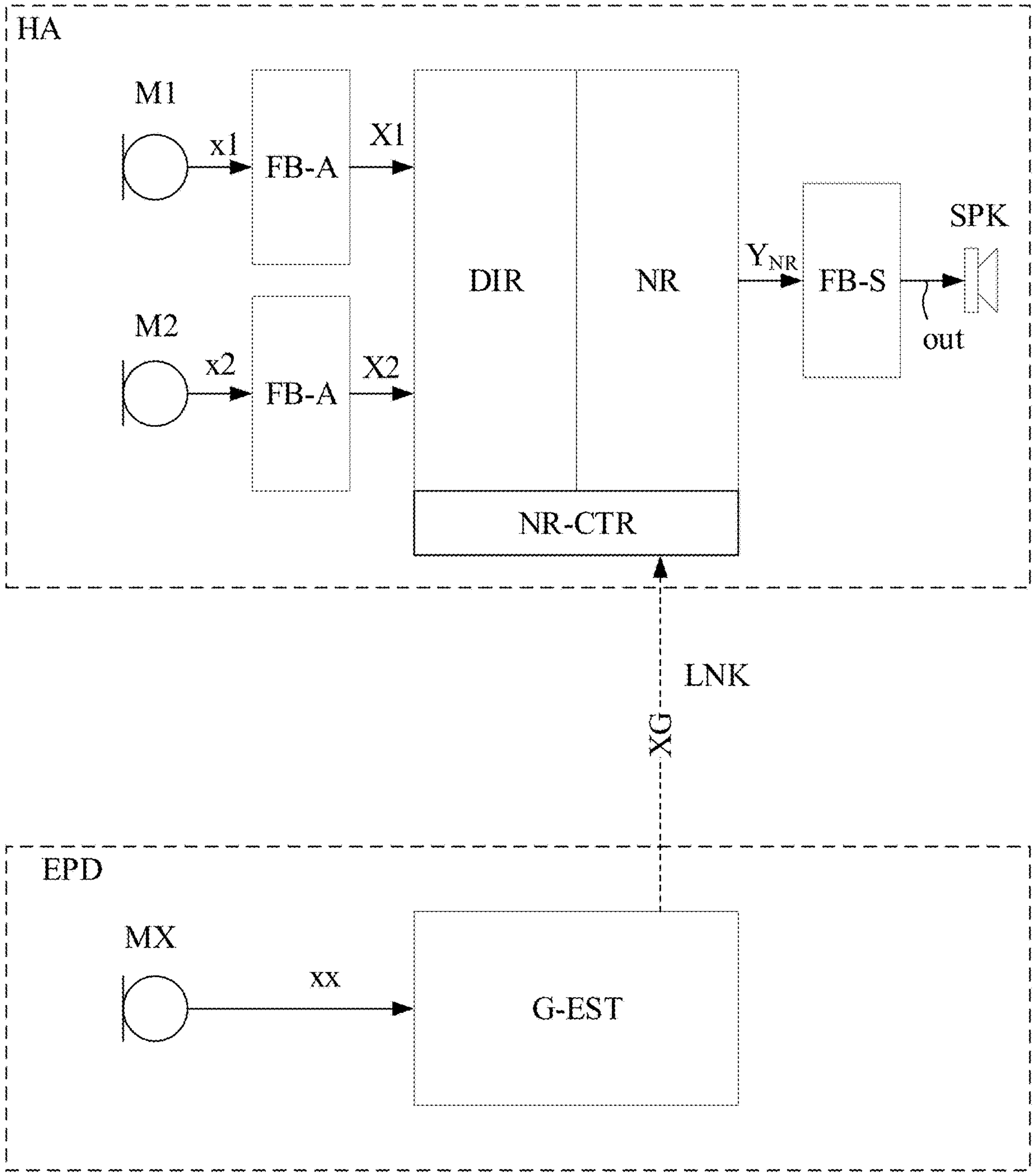
FIG. 2 shows a scenario showing how an externally estimated gain may be applied in a hearing aid.

FIG. 2 shows a scenario showing how an externally estimated gain may be applied to the local hearing aid microphones in a hearing aid (or a pair of hearing aids). The hearing system shown in FIG. 2 comprises a hearing ad (HA) and an external processing device (EPD) configured to allow a communication link (LNK) to be established between them. The hearing aid (HA) and the external processing device (EPD) may e.g. comprise appropriate antenna and transceiver circuitry allowing a wireless (e.g. data communication) link (LNK) to be established. The hearing system may e.g. at least comprise a wireless transmitter (Tx) in the external processing device (EPD) and a wireless receiver (Rx) in the hearing aid (HA), cf. e.g. FIG. 4, 5, 6). The hearing system may comprise a bidirectional communication link, e.g. allowing audio data to be transferred between the hearing aid (HA) and the external processing device (EPD).

The external processing device (EPD) comprises a microphone (MX) for picking up sound from the environment of the external processing device. The microphone (MX) provides an external electric input signal (XIN) representative of the sound from the environment. The external processing device (EPD) further comprises a gain estimator (G-EST) for providing an external set of processing parameters, e.g. estimated noise reduction gains (XG), configured to reduce noise in the external electric input signal (XIN) (when applied thereto, or to signal of the hearing aid (HA)).

The communication link (LNK) may e.g. be configured to allow gains (externally estimated gains, XG) estimated in the gain estimator (G-EST) of the external processing device (EPD) to be transmitted to the hearing aid(s) (HA) and applied there.

The hearing aid (HA) (or hearing aids) comprises at least one microphone, here two microphones (M1, M2) are shown, for picking up sound from the environment of the hearing aid(s). Each of microphones (M1, M2) provides an electric input signal (x1; x2) representative of the sound from the environment. Each of the microphone paths comprises an analysis filter bank (FB-A) for converting an (e.g. digitized) electric input signal (x1; x2) in the time-domain to an electric signal in the (time-) frequency domain (k, l), each providing a frequency sub-band representation of an electric input signal (X1, X2), where k and l are frequency and time indices, respectively, and k=1, . . . , K, where K is the number of frequency sub-bands. The hearing aid (HA) (or hearing aids (HA1, HA2)) further comprises noise reduction system (DIR, NR) configured to reduce noise components relative to target signal components in the electric input signals. The noise reduction system comprises a directional system (DIR) configured to provide a spatially filtered (beamformed) signal as a weighted combination of the electric input signals (X1, X2). The noise reduction system further comprises a noise reduction algorithm (NR). The noise reduction algorithm may, e.g., be implemented using a post-filter controlled by a noise reduction control signal comprising (resulting) gains (attenuation) for being applied to the spatially filtered signal from the directional system to attenuate remaining noise components in the spatially filtered signal relative to target signal components and to provide a noise reduced signal (YN). The hearing aid (HA) (or hearing aids (HA1, HA2)) further comprises a synthesis filter bank (FB-S) configured to convert a frequency sub-band signal (YN) to a time domain output signal (OUT). The output signal (OUT) is fed to an output transducer (SPK) for presentation to the user (U) as an acoustic signal. The output transducer may alternatively be or comprise an electrode array of a cochlear implant type hearing aid (in which case the synthesis filter bank (FB-S) can be dispensed with) or a vibrator of a bone conduction type hearing aid.

The directional system (DIR) may contain an adaptive beamformer. The adaptive beamformer may e.g. be an MVDR beamformer, an LCMV beamformer or a generalized eigenvector (GEV) beamformer. The adaptive beamformers may be based on estimates of target covariance and/or noise covariance matrix estimates. Target and noise covariance matrices may be updated based on a voice activity estimator determining whether a time-frequency tile is mainly dominated by speech or by noise. A voice activity estimate may be provided by the external processing device or estimated in combination with the local microphones and the external processing device.

The at least one hearing aid (HA) further comprises a noise reduction controller (NR-CTR) configured to determine a local set of noise reduction parameters (LG, cf. e.g. FIG. 5) based on the local (hearing aid) electric input signals (X1, X2). The noise reduction controller (NR-CTR) is configured to determine a resulting set of noise reduction parameters (RG, cf. FIG. 4, 5, 6) based on the local set of noise reduction parameters, or on the external set of noise reduction parameters (XG, received from the external processing device), or on a mixture thereof, in dependence of a noise reduction control signal.

In the embodiment of FIG. 2, the external set of noise reduction parameters (XG) is received in the hearing aid from the external processing device (EPD), where it is estimated in the gain estimator (G-EST) in dependence of the EPD-electric input signal (xx) from the microphone (MX) of the external processing device (EPD). Simultaneously, a local set of noise reduction parameters is estimated in the noise reduction controller (NR-CTR) based on the local HA-electric input signals (X1, X2).

It is preferable that the estimated gain has the same frequency resolution (e.g. defined by the number of frequency sub-bands K) as the frequency resolution in the hearing aids. One way to ensure this is to base the gain estimation on the same (type and order of) filter bank in the external processing device as the filter bank available in the hearing aid.

Figure 3:
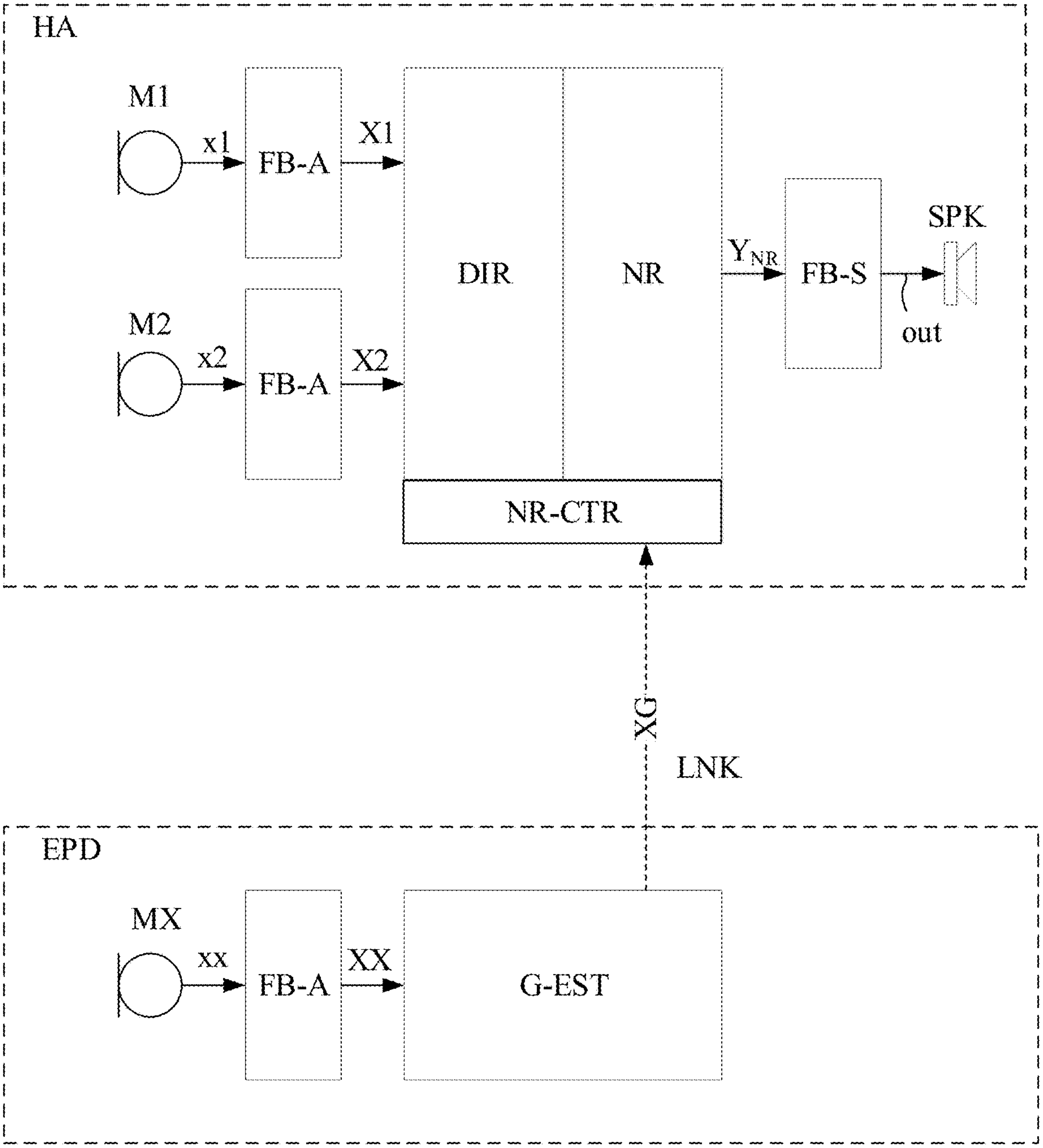
FIG. 3 shows an embodiment of a hearing system using the same analysis filter bank in the external processing device as in the hearing aid may increase the probability that the externally estimated gain is time-aligned with the hearing aid, when applied.
Figure 4:
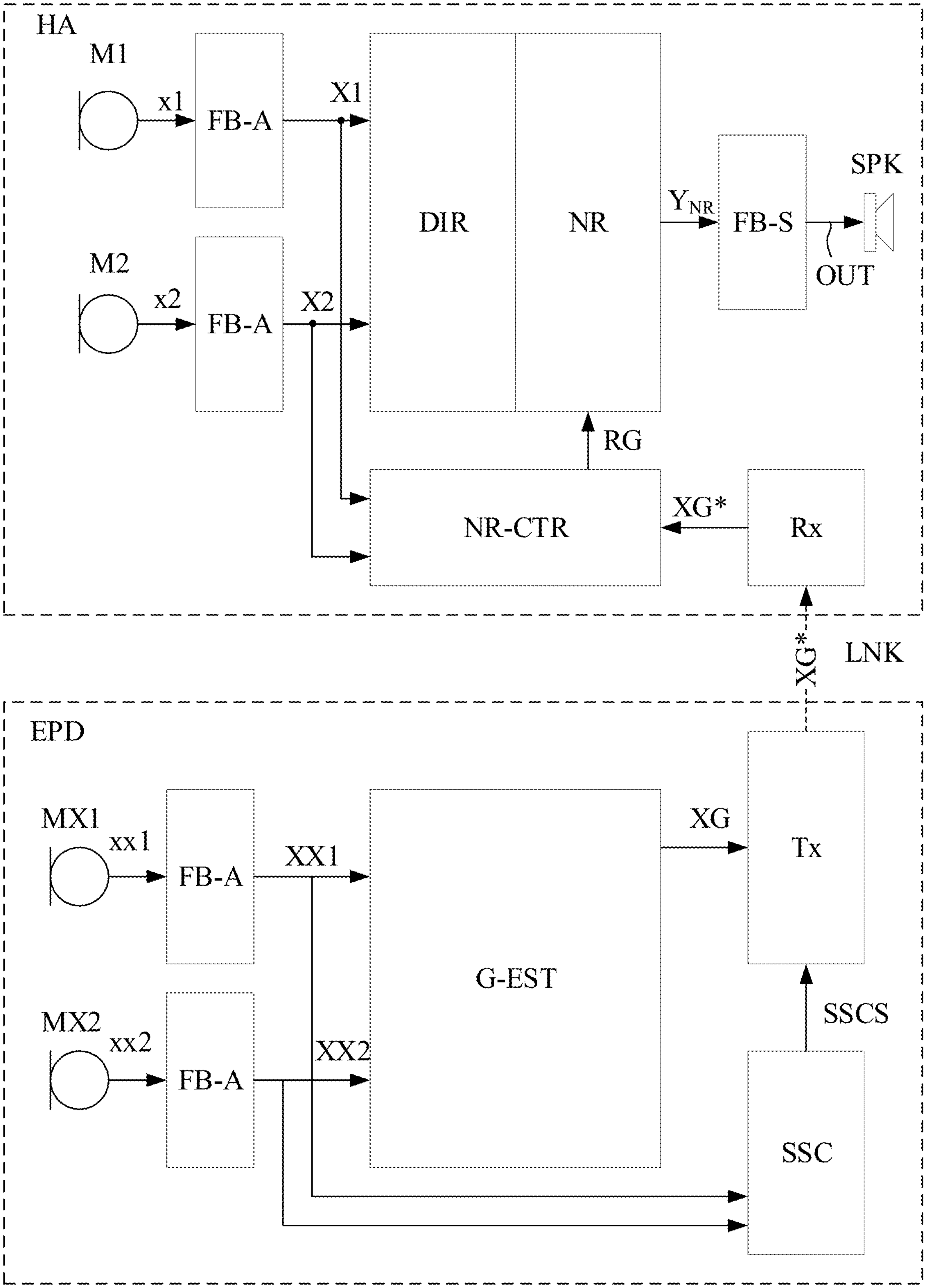
FIG. 4 shows an embodiment of hearing system according to the present disclosure wherein the external processing device contains more than one microphone allowing the externally estimated gain to be based on spatial properties, to provide better gain estimates.

This is illustrated in FIG. 3 and in FIG. 4 showing the case with more than one microphone in the external processing device (EPD). By using the same filter bank (with similar frequency resolution and same decimation) it we also ensure that the processing delay due to the analysis filter bank in the hearing aid and the external processing device is similar.

In an embodiment, the filter banks in the hearing device and in the external processing device have the same frequency resolution and decimation (e.g. down-sampling) and the same prototype filters (i.e. same window function). In another embodiment, the filter banks in the hearing device and in the external processing device have the same centre frequency and the same decimation but different prototype filters (e.g. different window function). The prototype filter of the hearing device may e.g. have a wider main lobe and high sidelobe attenuation, whereas the prototype filter of the external processing device may have a narrower main lobe but less sidelobe attenuation.

In an embodiment, the transmitted noise reduction parameters have been decimated.

FIG. 3 shows an embodiment of a hearing system according to the present disclosure using the same (type of) analysis filter bank (FB-A) in the external processing device (EPD) as in the hearing aid (HA). This is intended to increase the probability that the externally estimated gain is time-aligned with the hearing aid (HA), when applied in the noise reduction algorithm (NR) of the hearing aid (HA). The embodiment of FIG. 3 is identical to the embodiment of FIG. 2 apart from the analysis filter bank (FB-A) inserted in the microphone path of the external processing device (EPD). The analysis filter bank (FB-A) is configured to convert the (e.g. digitized) electric input signal (xx) in the time-domain to an electric signal (XX) in the (time-) frequency domain (k, l), each providing a frequency sub-band representation of the electric input signal (xx), where k and l are frequency and time indices, respectively, and k=1, . . . , K, where K is the number of frequency sub-bands. The parameters defining the configuration of the analysis filter bank (FB-A) of the external processing device (EPD) are identical to the parameters defining the configuration of the analysis filter bank(s) (FB-A) of the hearing aid(s) (HA).

FIG. 4 shows an embodiment of hearing system according to the present disclosure wherein the external processing device (EPD) contains more than one microphone (MX1, MX2) providing respective (e.g. digitized) time-domain electric input signals (XX1, XX2) allowing the externally estimated gain (XG) to be based on spatial properties, to provide better gain estimates. The embodiment of FIG. 4 is identical to the embodiment of FIG. 3 apart from the external processing device (EPD) comprising a further microphone path (comprising microphone (MX2) providing further external electric input signal (XX2) and corresponding analysis filter bank (FB-A) providing EPD-electric input signal in the (time-) frequency domain (k, l), as frequency sub-band signal (XX2). The gain estimator (G-EST) for providing estimated gains (XG) of the embodiment of FIG. 4 thus receives two microphone input signals (XX1, XX2) in the time-frequency domain. The gain estimator (G-EST) may thus comprise a directional system to improve the estimation of the noise reduction gains (XG) in the external processing device (EPD). This may e.g. be achieved using a conventional target cancelling beamformer (blocking matrix) to estimate noise in the target signal (see e.g. EP2701145A1, or EP3253075A1). The gain estimator (G-EST) may further comprise a voice activity detector providing (e.g. on a frequency sub-band level) an estimate of the presence (or a probability of the presence) of speech in an electric input signal (e.g. XX1 or XX2) or in a signal derived therefrom (e.g. a beamformed signal). Thereby beamformer weights of the directional system may be adaptively updated. A voice activity estimator, an SNR estimator or similar may be used to update the target and/or noise covariances based on the local microphone signals.

The hearing aid (HD) comprises a data receiver (Rx) configured to receive data via a communication link (LNK) from the external processing device (EPD). The external processing device (EPD) comprises a data transmitter (Tx) configured to transmit data, including an external set of noise reduction parameters (XG), via the communication link (LNK) to the hearing aid (HD). The hearing system is configured to control the communication link (LNK) to allow enabling/disabling the transmission of data by the external processing device, or reception of data by the hearing aid, in dependence of a link control signal. In the embodiment of FIG. 4, the external processing device (EPD) comprises a sound scene classifier (SSC) for classifying an acoustic environment around the hearing system and providing a sound scene classification signal (SSCS) representative of the current acoustic environment around the hearing system. The sound scene classifier may be configured to classify the current acoustic environment around the hearing system according to its complexity for a hearing impaired person. In the embodiment of FIG. 4, the hearing system is configured to control the communication link (LNK) in dependence of the sound scene classification signal (SSCS). The external processing device may be configured to enable transmission of data to the hearing aid in dependence of the sound scene classification signal, e.g. when the sound scene classification signal represents a complex sound scene. Hence, only if the sound scene is estimated to be complex, the hearing aid may receive data from the external device (including the external set of noise reduction parameters, XG).

An advantage of using an externally estimated gain (XG) is that the external processing device due to its less strict constraints on size and power consumption may contain additional microphones (e.g. two or more) as well as much more processing power (than the hearing aid). The external processing device may not be subject to the same size constraints as apply to a typical hearing aid adapted for being located at or in an ear of a user. The external processing device (EPD) may be configured to be kept in a pocket of the user, or to be attached to the body or to clothing of the user (to allow microphone(s) of the external processing device to be directly 'accessible' for sound impinging on the user).

Also, it is an advantage that only estimated gains (XG) (plus optional control signals) have to be transmitted to the hearing instrument (as opposed to a full audio signal or signals). Compared to transmitting an audio signal, transmitting a gain requires less bandwidth. Hereby it is possible to transmit more frequently (e.g. via a magnetic link, an FM-link or an RF link (e.g. Bluetooth low energy (BLE) or ultra wideband technology (UWB)), such as transmitting every millisecond or every second millisecond (e.g. using an update transmit frequency $f_{UT} \geq 0.5$ kHz, or $f_{UT} \geq 1$ kHz). Hereby the latency due to transmission can be minimized and ensure a better time alignment between the externally estimated gain and the signal in the hearing devices.

Furthermore, an advantage of applying the external gain to the local microphone signals rather than e.g. transmitting an enhanced audio signal from the external processing device is that spatial cues, such as interaural time (ITD) and level differences (ILD), are better maintained in the audio signal presented to the listener when based on the sound picked up at the local microphones near each ear.

The more processing power may e.g. allow the estimation of gains using a (e.g. large) deep neural network (DNN). In other words, the gain estimator (G-EST) may comprise (or be constituted by) a deep neural network. DNNs may as well be used to estimate other parameters such as SNR or voice activity.

The neural network may be trained on various sound scenes. Even though the input features are based on the microphones of the external processing device, an ideal target gain used during training may be based on either the external microphones, the microphones in one or both of the hearing aids or a target gain derived from a combination of all available microphones. In an embodiment, separate gain patterns are transmitted from the external processing device to each hearing instrument.

In another embodiment, the gain estimator (G-EST) of the external processing device (EPD) is able to estimate multiple audio signals and transmit separate gains for different target audio signals simultaneously. E.g. the external processing device may be able to separate several simultaneous talkers and transmit a gain belonging to each separate signal. The external processing device may be able to transmit a separate gain for the user's own voice (cf. e.g. FIG. 5). The signal separation scheme may be based on spatial properties of the signals, i.e. different talkers come from different spatial directions. Especially the user's own voice also arrive from a specific spatial direction. Such processing schemes may be implemented in parallel in order to estimate several gain/snr/voice activity patterns in parallel.

Also a deep neural network may be trained to recognize specific voices, such as the user's own voice. Transfer learning may be used rather than retraining a full neural network. E.g. only the last layers of the network need to be re-trained for separation of a specific users' voice.

As the gain estimated in an external processing device possibly may remove noise completely, the hearing instrument may limit the maximum amount of noise reduction. The maximum amount of attenuation may depend on the complexity of the environment, e.g. at low input levels or at high SNR, it may not be necessary to remove noise. The amount of noise reduction may also depend on a sound scene classifier (SSC). The hearing aid may comprise a (or the) sound scene classifier (or an SNR estimator or a level estimator e.g. a noise level estimator).

In the embodiment of FIG. 4, a (or the) sound scene classifier is implemented in the external processing device (EPD), and information on the sound scene is transmitted to the hearing aid(s) (HA), cf. transmitted signal XG*. The hearing system may be configured to transmit the sound scene classification signal (SSCS) indicative of a complexity of the current sound scene around the hearing system from the external processing device (EPD) to the hearing aid (HA, e.g. to the noise reduction controller (NR-CTR)). The transmitted signal (XG*) may thus comprise the external set of noise reduction parameters (XG) (e.g. estimated noise reduction gains) as well as the sound scene classification signal (SSCS) (and optionally other control signals from the external processing device). Thereby the noise reduction controller (NR-CTR) may control the resulting noise reduction gain in dependence of the complexity of the current acoustic environment (sound scene, cf. signal SSCS).

In an embodiment, a gain estimated from the local hearing aid microphones (M1, M2) ('the local set of noise reduction parameters') is combined with the gain (XG) received from the external processing device (EPD) ('the external set of noise reduction parameters'). In the embodiment of FIG. 4, this is performed in the noise reduction controller (NR-CTR). The combination may e.g. be based on a maximum or a minimum operator. Something similar may apply for externally estimated VAD estimates.

In a setup, where the transmission from the external processing device to the hearing aid is mono-directional (i.e. no transmission of data from hearing aid to external processing device), it may be necessary to determine if the external processing device is sufficiently close to the hearing instrument (otherwise the estimated time-frequency gain from the external processing device may be misaligned with the local microphone signals). If the microphones of the hearing device(s) are close to the microphones of the external processing device, such as closer than a threshold value, e.g. 30 centimetres or more, e.g. less than 1.5 m, it is expected that the received audio signals are highly correlated, with a time of arrival difference less than one millisecond. As the envelope of the received gain pattern is well correlated with the local microphone signal, we may determine the time lag between the received gain pattern and the local microphone signal (or a signal derived from the local microphone signal(s), such as an envelope signal). Only if the time lag is smaller than a pre-determined threshold (e.g. 1 ms or 2 ms), the external gain will be applied in the local hearing device, see FIG. 8 below. Alternatively, the quality of the transmission link may be used to qualify the external signal. E.g. an external signal with poor signal strength or many drop-outs may be too far away from the hearing aid user to provide appropriate processing parameters for the hearing aid(s).

Rather than either using the external signals or not, the estimated distance/signal quality may as well be used to control how e.g. the local and the external gain may be combined, where low distance/high signal strength may be in favor of utilizing the external gain, and where a longer distance or a poor signal strength may be in favor of utilizing the gains estimated from the local microphones.

A distance estimate may be used to determine which frequency bands from the external processing device to use, as the low frequency gain estimates may be valid at greater distances than high frequency gain estimates.

The hearing aid may comprise a distance estimator, and feed a distance estimate (or a control signal indicative thereof) to the noise reduction controller (NR-CTR). The distance estimator may form part of the noise reduction controller.

In the case of own voice, a high correlation between the local microphones and the received externally estimated gains (XG) is expected, because the own voice will be close to both the hearing instrument and the external microphone signal, if the external device is worn on the user's body.

On the other hand, in the case where the external microphone is not close to the user's mouth, we will notice that the delay of the received estimated own voice gain (or own voice signal, if that is transmitted) is delayed compares to the locally picked up own voice signal. The advantage of using the own voice scenario compared to other acoustic scenes is that the mouth relative to the hearing instruments is in a fixed setup, and we can detect own voice locally.

So compared to all external sounds we have a better estimate of whether the external device is close to the user or further away. It may thus be advantageous to estimate the time lag of maximum correlation based on time frames (or time-frequency units) when own voice is estimated by the local microphones. This is illustrated in FIG. 5.

Figure 5:
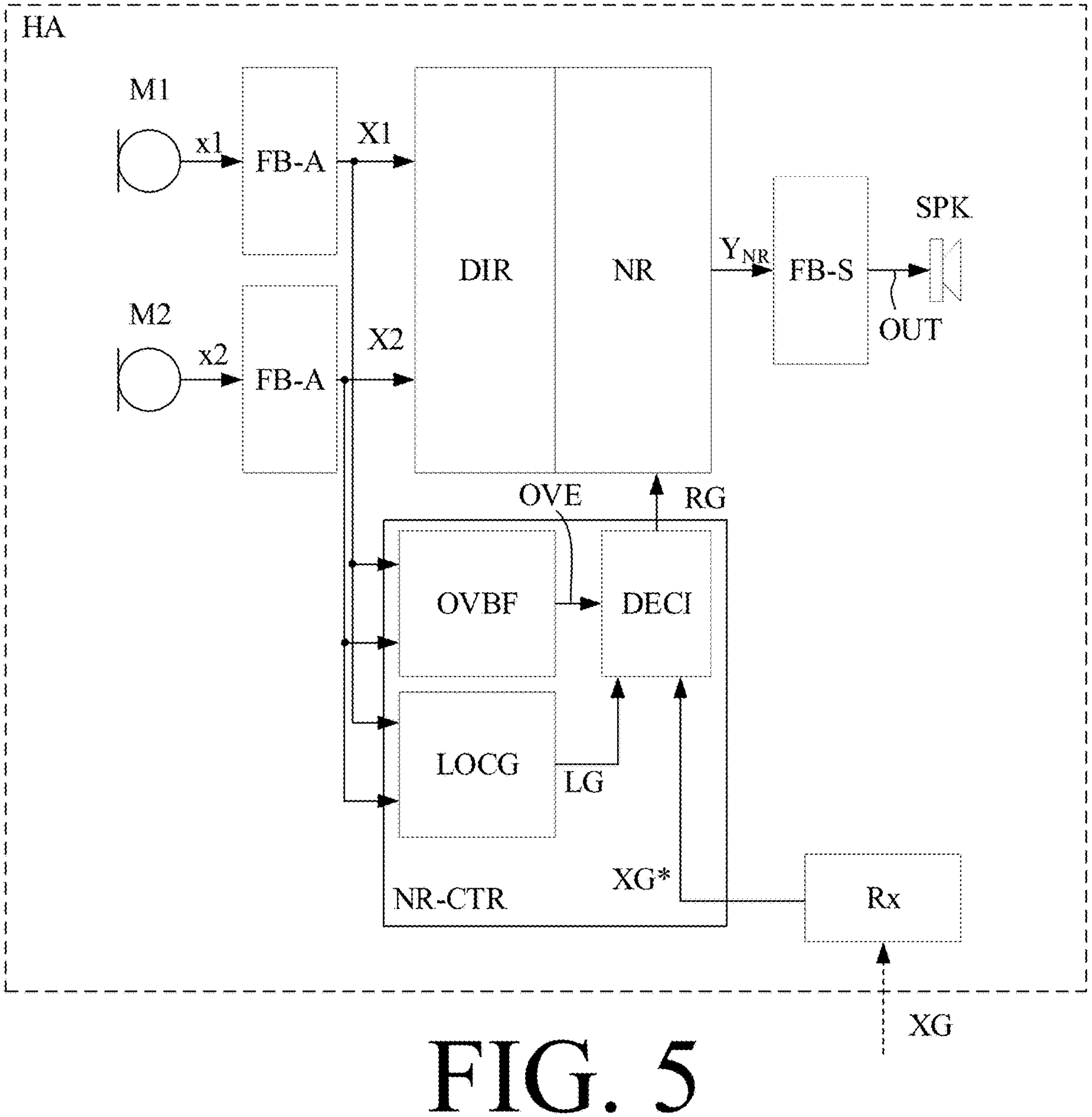
FIG. 5 shows a hearing aid configured to receive an estimated gain from an external processing device according to the present disclosure.

FIG. 5 shows a hearing aid (HA) configured to receive an external set of noise reduction parameters (e.g. estimated gains (XG)) from an external processing device (EPD, see e.g. FIG. 1-4, according to the present disclosure. The hearing aid (HA) of FIG. 5 is similar to the embodiments of a hearing aid of FIG. 2-4 but additionally comprises an own voice beamformer (OVBF) configured to estimate the user's own voice. In the embodiment of FIG. 5, the own voice beamformer (OVBF) forms part of the noise reduction controller (NR-CTR)). The own voice beamformer (OVBF) receives the first and second HA-electric input signals (X1, X2) in a frequency sub-band representation. The own voice beamformer (OVBF) comprises (predetermined or adaptively updated) beamformer weights that when applied to the first and second electric input signals (X1, X2) provides an estimate (OVE) of the user's own voice. The hearing aid (HA) of FIG. 5 (here the noise reduction controller (NR-CTR)) further comprises a controller (DECI) configured to decide whether or not or with what weight to apply the externally estimated gains (XG) in the noise reduction algorithm (NR) of the hearing aid (HA). The noise reduction controller (NR-CTR) is configured to determine a local set of noise reduction parameters (LG). The local set of noise reduction parameters (LG) are provided by a local parameter estimator (LOCG) in dependence of the local HA-electric input signals (X1, X2), and optionally further control signals. The noise reduction controller (NR-CTR) may e.g. comprise a voice activity detector (e.g. on own voice activity detector) configured to (e.g. continuously) provide an estimate (e.g. a probability) that a given electric input signal or a signal originating therefrom (at a given time) comprises speech (e.g. speech of the user). Such detector(s) may be advantageous in case beamformer weights are adaptively determined (e.g. updated during use of the hearing system). An external voice activity detector signal may e.g. be used to update estimates of own voice and noise covariance matrices for enhancement of own voice.

If own voice is detected, the external device may be set in a mode, where it not only transmits a noise reduction parameter, but also transmits the own voice signal picked up by the microphones. Typically, own voice will not be presented to the hearing aid user (but e.g. transmitted via a phone during a phone conversation.) Thus, the processing delay is less critical, and both processing delay and transmission delay can better be tolerated. We may thus take advantage of transmitting an own voice signal, simply because the delay is less time critical (we have better time to process and transmit this signal compared to other signals).

When the externally determined gain (XG) is transmitted, it is important that the external processing device (EPD) is not too far from the local hearing instrument (e.g. ≤0.5 m). If the external microphone(s) and the local microphone(s) are, located relatively close to each other, we will expect that the signals are more time-aligned compared to when the microphones are located further from each other. In particular, when own voice is detected at the local microphones, we would expect the time delay between the own voice signal picked up by the external processing device (by its microphone(s)) and the own voice signal picked up by the hearing aid microphone(s) to be within a certain range, if the external processing device (including its microphone(s)) is correctly mounted (e.g. ≤0.5 m from the hearing aid(s)). We may find the time delay during presence of own voice (where we would expect a sufficiently high SNR at all microphones, because of the small distance to the sound source (mouth of the user)) by comparing the waveform of the own voice signal (OVE, in time and frequency) to the waveform of the received gain (XG), cf. e.g. FIG. 7A, 7B. This may be done in the controller (DECI) forming part of the noise reduction controller (NR-CTR) of FIG. 5 and used to decide whether or not the externally determined gains (XG) shall be used in a current situation. The externally determined gains (XG) may e.g. be applied in the hearing aid(s), if it is detected that the external processing device (EPD) is correctly mounted (in an appropriate distance from the hearing aid(s)). The externally determined gains (XG) may, however, be disabled during own voice and applied only to other speech signals (e.g. controlled by the controller (DECI)).

In order to minimize the processing latency, we propose a hearing aid system (see e.g. FIG. 1, 2, 3, 4, 6) with Hearing aid(s) mounted at the ear(s) with local microphones (see e.g. FIG. 1-6).

An external processing device with at least one microphone (see e.g. FIG. 1, 2, 3, 4, 6).

A transmitter capable of continuously transmitting estimated gains from the external processing device to the hearing instruments.

A receiver for receiving externally determined gains and configured to be integrated with locally determined gains in the hearing instruments.

If no external gain is received, the hearing instrument processing will solely be based on the local gain estimates.

The externally determined gains may be estimated based on a deep neural network.

An advantage of the present disclosure is that no signals (necessarily) need to be transmitted from the hearing aid to the external processing device (whereby power can be conserved in the hearing aid).

Figure 6:
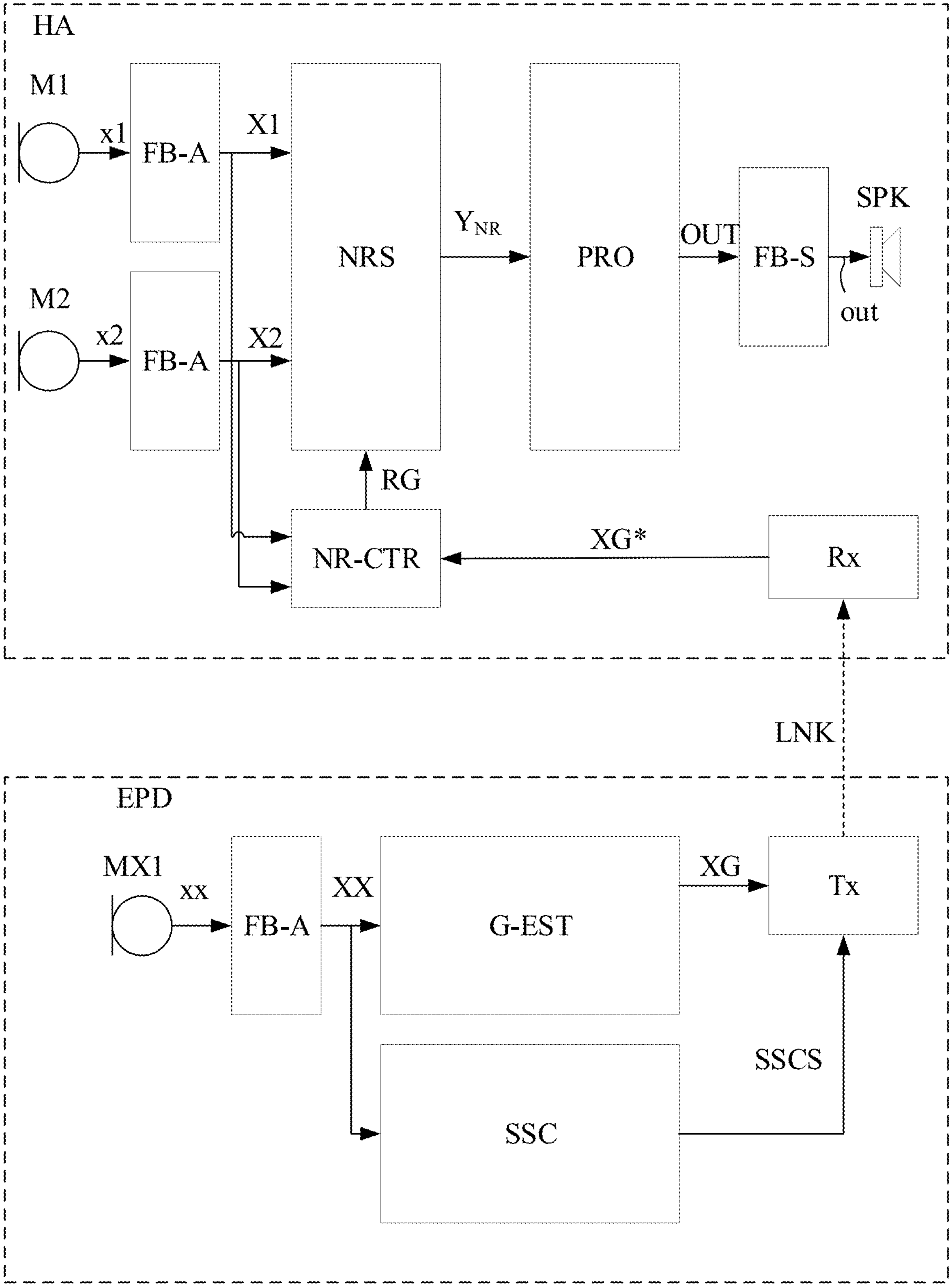
FIG. 6 shows an embodiment of hearing system according to the present disclosure wherein the external processing device contains a sound scene classifier configured to control transmission of the external set of noise reduction parameters to the at least one hearing aid.

FIG. 6 shows an embodiment of hearing system according to the present disclosure wherein the external processing device contains a sound scene classifier configured to control transmission of the external set of noise reduction parameters to the at least one hearing aid. The embodiment of a hearing system of FIG. 6 is similar to the embodiment of FIG. 4. A difference is that the external processing device of the embodiment of FIG. 6 only comprises a single microphone (MX1) providing a (e.g. digitized) electric input signal (xx) in the time-domain (as in FIG. 3). The sound scene classifier (SSC) thus determines the sound scene classification signal (SSCS) based only on the single (time-frequency domain) electric input signal (XX). Likewise, the noise reduction parameter estimation unit (G-EST) determines the external set of noise reduction parameters (XG, e.g. gains) based only on the single (time-frequency domain) electric input signal (XX). A further difference is that the embodiment of FIG. 6 comprises a hearing aid processor (PRO) for processing the noise reduced signal ($Y_{NR}$) from the noise reduction system (NRS) of the hearing aid (HA). The hearing aid processor (PRO) may e.g. be configured to apply one or more processing algorithms to the noise reduced signal ($Y_{NR}$) to compensate for a hearing impairment of the user. The processed output signal (OUT) from the hearing aid processor (PRO) is provided to the output transducer (SPK) via the synthesis filter bank (FB-S). The noise reduction controller (NR-CTR) of the embodiment of FIG. 6 may e.g. be configured as described in connection with any of FIG. 2, 3, 4, 5. The noise reduction controller (NR-CTR) may e.g. comprise a distance estimator for providing an estimate of a current distance between the hearing aid(s) and the external processing device. The distance estimate may e.g. be based on transmission quality (e.g. bit error rate) or on a relation between transmitted and received power (e.g. signal strength) of the wireless data communication link (LNK) between the external processing device and the hearing aid(s).

The external set of noise reduction parameters may include speech/voice activity estimates, signal-to-noise ratio estimates, or gain estimates.

Figure 7A:
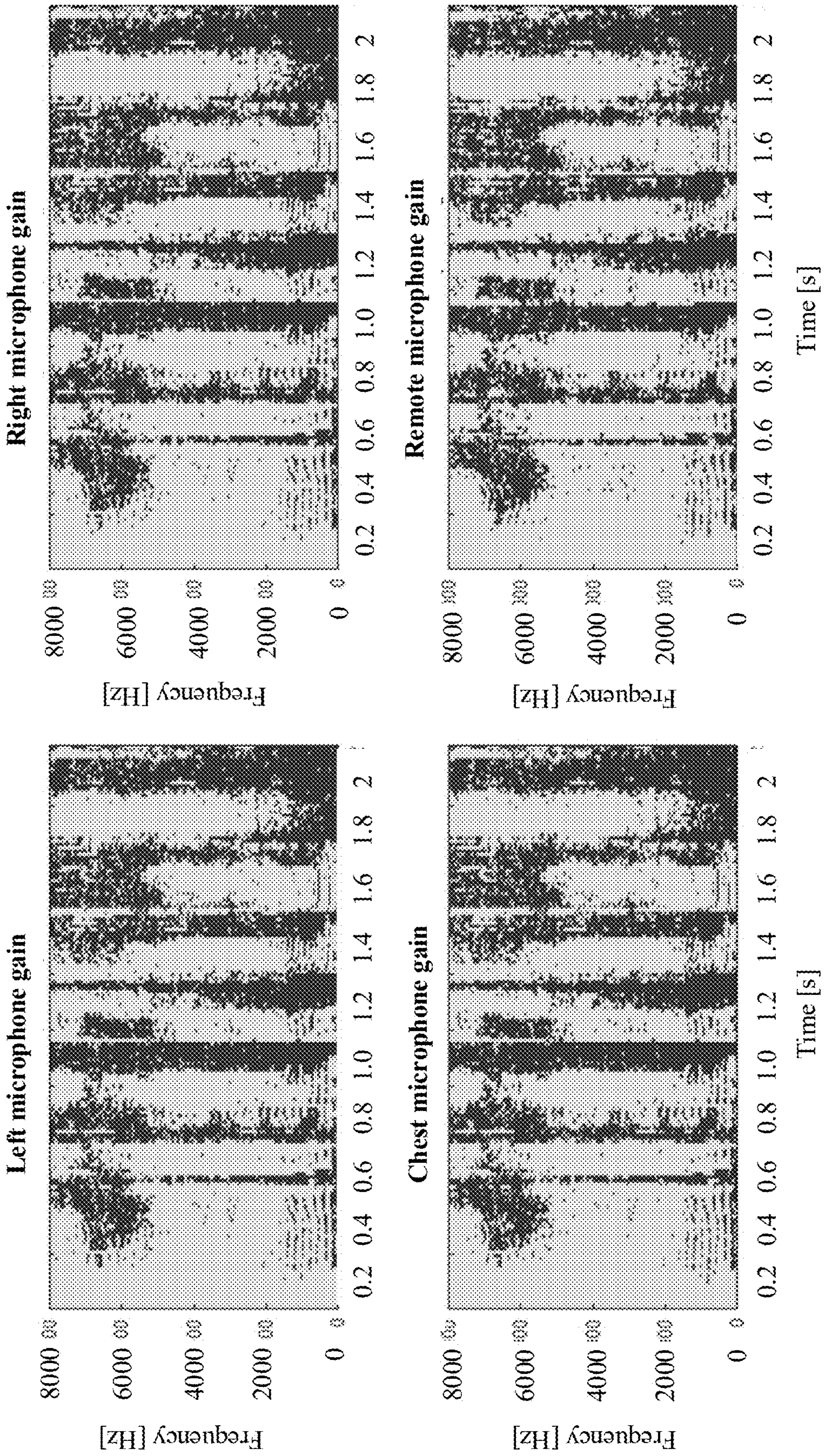
FIG. 7A shows noise reduction gains as estimated based on microphones in respective left and right hearing aids, and in external processing devices located in first and second distances from the left (reference) microphone (where the first distance is smaller than the second distance)

FIG. 7A shows four exemplary noise reduction gains as estimated based on microphones in respective left and right hearing aids, and in external processing devices located in first and second distances from the left (reference) microphone (where the first distance is smaller than the second distance).

Figure 7B:
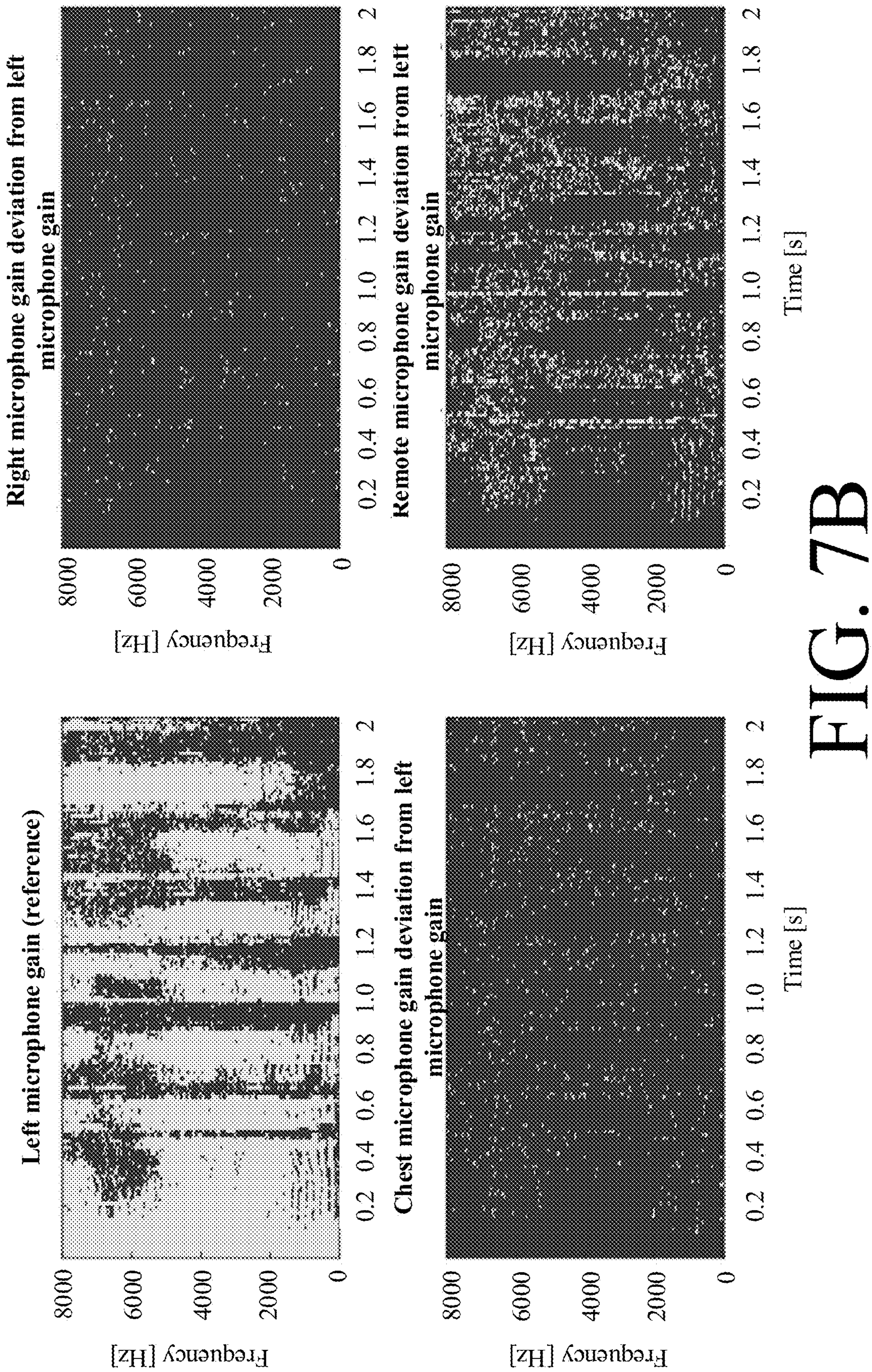
FIG. 7B shows the noise reduction gains (termed the reference gain) provided by the left hearing aid on the basis of the signal from the left (reference) microphone (as in FIG. 7A) and differences between the reference gains and 1) the right microphone gains, 2), 3) the microphone gains of the external processing device when located at the first and second distance, respectively, from the reference microphone.

FIG. 7B shows noise reduction gains provided by the left hearing aid (termed the reference gains) on the basis of the signal from the left (reference) microphone (as in FIG. 7A) and differences between the reference gains and 1) the gains determined in the right hearing aid based on the right microphone, and between the reference gains and the microphone gains of the external processing device when located at the first 2) and second 3) distance, respectively, from the reference microphone.

The plots of FIG. 7A, 7B represent so-called spectrograms representing gain (or gain differences), e.g. real values (magnitudes) thereof, versus frequency ([Hz]) (vertical axis) and time ([s]) (horizontal axis). The illustrated frequency range is between 0 and 8000 Hz, which is a normal range of operation of a hearing aid. The illustrated time range is between 0 and 2 s. The plots represent a short time segment of speech in noise for which appropriate noise reduction gains (attenuation) have been calculated in the respective devices, where the sound is picked up (cf. FIG. 7A). The four devices in question are 1) left and 2) right hearing aids, and 3), 4) external processing devices located close to (≈0.3 m from) the left hearing aid and farther away (≈3 m) from the left hearing aid, respectively.

In order to justify the use of an externally estimated microphone gain, ideally estimated binary gains based on a collocated target and noise signal have been calculated and displayed in FIG. 7A, 7B. The difference between the different gain patterns (FIG. 7B) are thus mainly given by the difference in transfer functions from the source to the different microphones. As we see the dark grey areas where target signal components dominate are very similar at the different microphone positions, i.e. left ear, right ear, chest (e.g. ≈0.3 m from the ears) and a remote microphone (e.g. ≈3 m from the ears). When the target occupies the same areas in time and frequency (time-frequency units), we may as well apply a gain estimate derived from the external processing device (e.g. located on the chest, denoted 'the chest microphone') to the left microphone signals.

However, the further away the external microphone is from a reference microphone position (in FIG. 7B, e.g. chosen to be a microphone of a hearing aid located at the left ear of the user), the more deviation we see between the time-frequency units where speech is active (see FIG. 7B).

The light grey areas (time-frequency units) in FIG. 7B shows the time frequency units of speech activity (or noise activity deviating from the (left) reference microphone. Especially, we see a deviation for the remote microphone—mainly due to the fact that the microphone is further away from the reference microphone (e.g. ≈3 m), and the speech activity pattern is thus delayed in time. In the upper left corner of FIG. 7B, the light grey areas show noise activity. In the other images, the light grey areas show the differences of speech/noise activity of the different microphones compared to the upper right reference microphone (we do not distinguish between whether the difference is due to noise/speech or speech/noise differences).

Instead of binary noise reduction gains (as exemplified in FIG. 7A, 7B), however, the binary gains, may be interpreted as a binary voice activity estimate indicating whether speech is present or absent in a given time-frequency tile.

Figure 8:
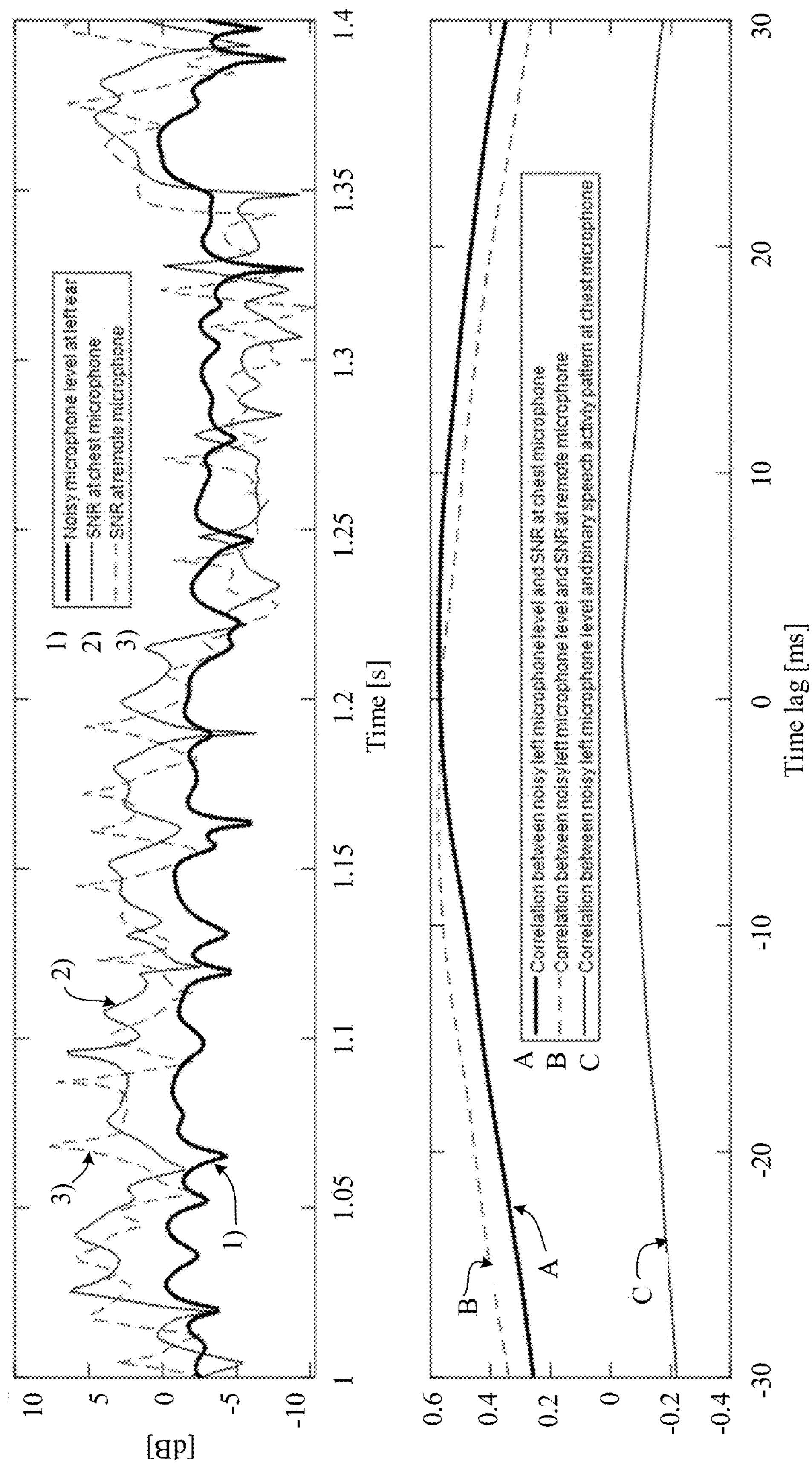
FIG. 8 shows correlation between the level of a noisy microphone signal picked up by a hearing aid microphone at an ear of a user and an SNR estimate or a voice activity pattern of a signal picked up by a microphone of an external processing device.

FIG. 8 shows correlation between the level of a noisy microphone signal picked up by a hearing aid microphone at an ear of a user and an SNR estimate or a voice activity pattern of a signal picked up by a microphone of an external processing device>.

The top plot shows corresponding (simultaneously recorded) time segments (of 0.4 s duration) of three time-variant signals ([dB] versus time [s]). The bold solid line graph (denoted '1)') shows the level of an exemplary noisy microphone signal picked up by a microphone (of a hearing aid) at an ear of a user (e.g. the left ear). The thin solid line graph (denoted '2)') shows an SNR estimate obtained from a chest microphone (located at the chest of the user), and the dashed line graph (denoted '3)') shows an SNR estimate obtained from a (more) remote microphone picked up farther from the user than the chest microphone.

The lower plot illustrates how the level of the noisy microphone signal (in a single frequency channel) is correlated with the SNR estimate obtained from a) the chest microphone (bold solid line graph, denoted 'A'), and b) the (more) remote microphone (dashed line graph, denoted 'B'). The lower plot further illustrates how the level of the noisy microphone signal (in a single frequency channel) is correlated with the voice activity pattern of a signal picked up by a chest microphone (located at the chest of the user, solid line graph, denoted C).

It can be concluded that the correlation between either microphone signals, gain, voice activity, or SNR estimates can be used to determine if the gain is obtained from a microphone located close to the reference microphone (here a microphone of a hearing aid at a left ear of the user) or a microphone located further away. The closer the microphone is to the reference microphone the more likely it is that the maximum correlation is close to lag 0. But a distance between the hearing aids and the external processing device (e.g. a chest microphone) below a threshold allows the use of parameters of microphone signals picked up in the external processing device to be used 'directly' in the hearing aid. The plot disregards any additional transmission delay. (i.e. delay due to transmitting multiple frames simultaneously). As only little data need to be transmitted, it may be advantageous to transmit frequently, e.g. every millisecond, every second millisecond or with a rate of 200 Hz or 100 Hz. The gain may as well be low-pass filtered and down-sampled before transmitted. The transmission link may be based on an inductive link, an FM signal, or Bluetooth low energy (BLE), or UWB.

Noise reduction parameters estimated in the external processing device and transmitted to the hearing aid(s) for being used therein may e.g. be noise reduction gains. But other parameters may be used. The transmitted data from the external processing device may be an SNR estimate (which may be converted into a gain after the signal is received at the hearing aid, e.g. by an SNR to gain conversion algorithm, e.g. implemented as a Wiener gain curve).

A criterion for using the gain obtained from the external processing device, e.g. a chest microphone, may involve a direction of arrival of the target signal. If the target is from the front, it is easily picked up by the chest microphone, but if the target signal is impinging from behind the user, the target may be more attenuated at the chest microphone, as the target signal has to pass around the body on its way from the source to the microphone. On the other hand, a chest microphone may be better at attenuating noise from behind (compared to noise picked up by a hearing aid microphone), as the noise will be shadowed by the body. This implies that the user may benefit more from a chest microphone signal when the target is in front of the listener. The selection between using a gain obtained from the local hearing aid microphones and a chest microphone may thus be determined based on a DOA estimate on the local microphone: if a target talker is from the back, it may be better to use local microphone gains; otherwise, if the target talker is from the front, the external microphone gain may be better to apply at the hearing aid microphones.

Figure 9:
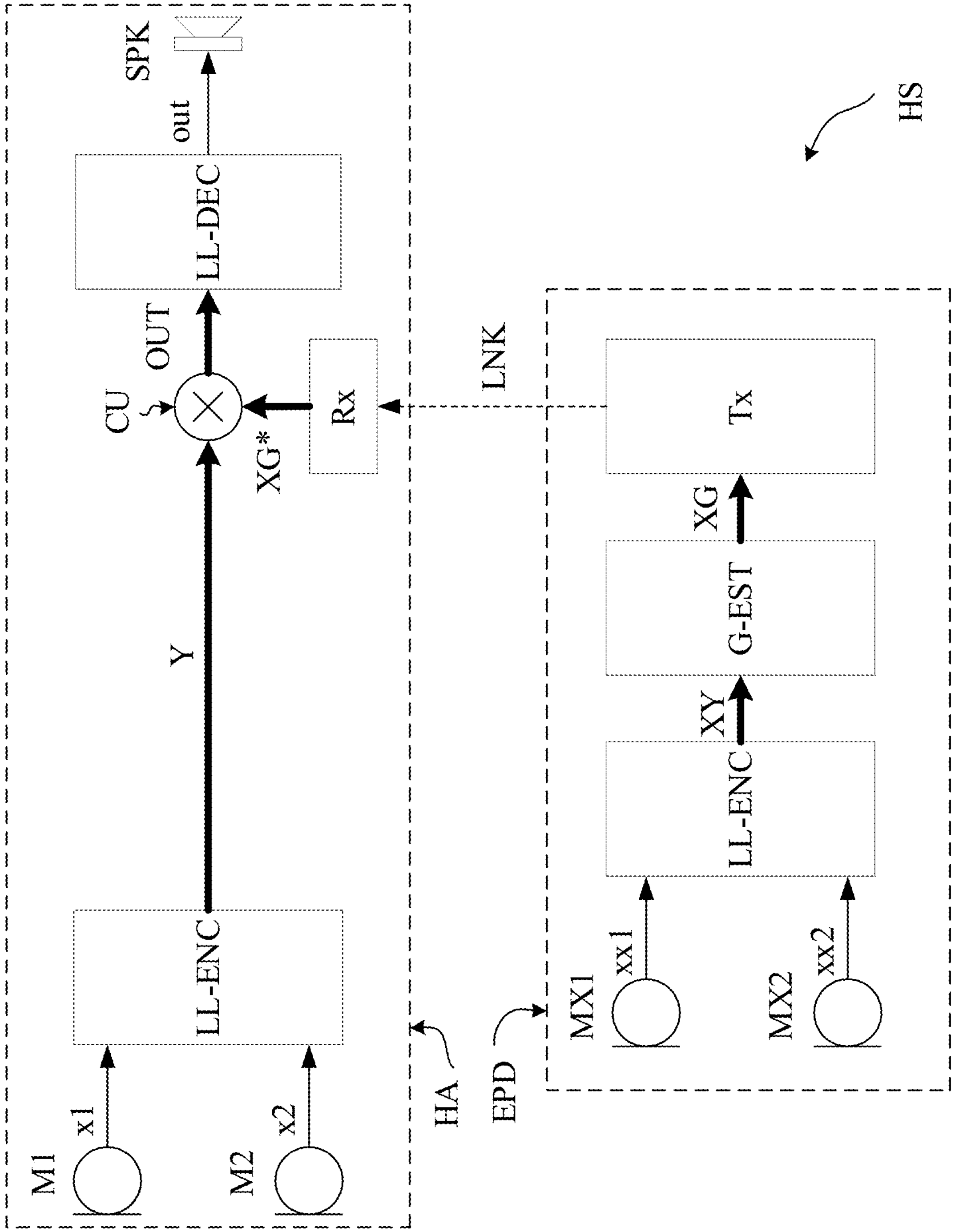
FIG. 9 shows an embodiment of a hearing system, comprising a hearing aid and an external processing device, according to the present disclosure.

FIG. 9 shows an example of a hearing system (HS), comprising a hearing aid (HA) and an external processing device (EPD), according to the present disclosure comprising a similar functional configuration as in FIG. 4, but without the sound scene classifier (SSC) in the external processing device (EPD). As in FIG. 4, the external processing device (EPD) contains more than one microphone, here two (MX1, MX2), providing respective (e.g. digitized) time-domain electric input signals (xx1, xx2) allowing the externally estimated gain (XG) to be based on spatial properties, to provide better gain estimates. The embodiment of FIG. 4 comprises respective analysis filter banks (FB-A) providing the electric input signals of the hearing aid (HA) and the external processing device (EPD) in the (time-) frequency domain (k, l), as frequency sub-band signals (X1, X2) and (XX1, XX2), respectively. Instead of analysis filter banks in the microphone paths of the hearing aid (HA) and the external processing device (EPD), the embodiment of FIG. 9 comprises respective low latency encoders (LL-ENC) configured to convert first and second streams of samples of electric input signals (x1, x2) of the hearing aid (HA) and first and second streams of samples of electric input signals (xx1, xx2) of the external processing device (EPD) in the time domain to respective streams of samples of the electric input signals in a second domain (Y; XY).

The hearing aid (HA) of FIG. 9 comprises a forward path comprising the (here two) microphones (M1, M2), respective low-latency encoders (LL-ENC) providing electric input signal(s) (Y) in the high dimensional domain, a combination unit ('X', here a multiplication unit), a low-latency decoder (LL-DEC) and an output transducer (SPK, here a loudspeaker). The estimated gains (XG), received by wireless receiver (Rx) in the hearing aid (HD) from the external processing device (EPD), are applied to the electric input signal(s) (Y) in the high dimensional domain in the combination unit ('X') of the hearing aid (HA) and the resulting processed signal (OOT) is fed to the low-latency decoder (LL-DEC) of the hearing aid (HA) providing a processed (time-domain) output signal (out). The processed output signal (out) is fed to the loudspeaker (SPK) of the hearing aid (HA) for presentation to the user as a hearing loss compensated sound signal.

The gain estimator (G-EST) of the external processing device (EPD) for providing estimated gains (XG) of the embodiment of FIG. 9 may receive two microphone input signals (XY) in the high dimension domain. The gain estimator (G-EST) may thus be configured to estimate gains (XG) for the two electric input signal(s) (Y) in the high dimensional domain of the forward path of the hearing aid. The estimated gains (XG) in the high dimensional domain are transmitted to the hearing aid (HA) via the wireless link (LNK) by transmitter (Tx) of the external processing device.

FIG. 9 shows a more general setup than FIG. 4. The encoder (LL-ENC) in the hearing instrument (HA) of FIG. 9 is similar to the encoder (LL-ENC) in the external processing device (EPD). The encoder may e.g. be an analysis filter bank or a trained neural network. The gain (XG) provided by the gain estimator (G-EST) of the external processing device may be estimated using a neural network under the constraint that the gain is time-aligned with the signal in the hearing device (e.g. by taking transmission delay into account).

The concept of low latency encoders and low latency decoders used in a hearing system is described in more detail in our co-pending European patent application number EP4099724A1.

Figure 10:
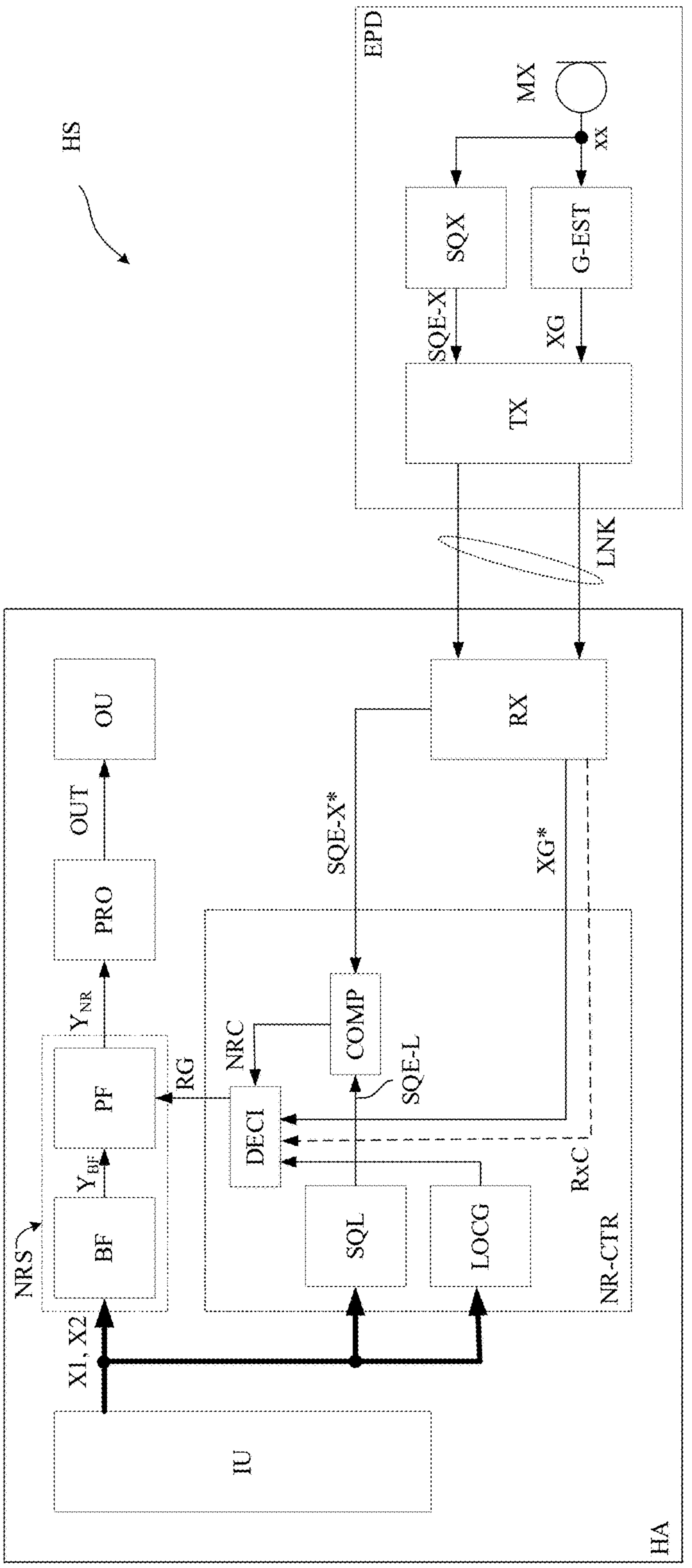
FIG. 10 shows an embodiment of a hearing system comprising and an external processing device, wherein the hearing aid comprises a noise reduction controller according to the present disclosure.

FIG. 10 shows an embodiment of a hearing system (HS) comprising a hearing aid (HA) and an external processing device (EPD), wherein the hearing aid comprises a noise reduction controller (NR-CTR) according to the present disclosure. The embodiment of a hearing system shown in FIG. 10 comprises some of the same elements that are shown and described in connection with the embodiments of FIGS. 2, 3, 4, 5, 6, and 9. The features of the embodiment of a hearing system shown in FIG. 10 is intended to be combinable with the features of the embodiments of FIGS. 2, 3, 4, 5, 6, and 9.

The (at least one) hearing aid (HA) is configured to be worn by a user at or in an ear of the user. The hearing aid comprises an input unit (IU) comprising at least two input transducers, each providing at least one electric input signal representing sound in the environment of the hearing aid (HA). The input unit may e.g. comprise respective analysis filter banks for providing the (e.g. two) electric input signals (X1, X2) in a time-frequency representation (k,l), k and l being frequency and time indices, respectively. The electric input signals (X1, X2) may be arranged as consecutive time frames (l=1, 2, . . . , 1', . . . ), each representing a frequency spectrum of the input signal in question with discrete (generally complex) values of the signal in question in each time frequency unit (k, l'), where the frequency index, k=1, . . . , K, and where K is smaller than or equal to the number of frequency bands provided by the analysis filter bank. The hearing aid (HA) further comprises a configurable noise reduction system (NRS) for reducing noise in the electric input signals (X1, X2) or in a signal originating therefrom (e.g. a beamformed signal, cf. e.g. FIG. 2-5) based on a resulting set of noise reduction parameters (RG). The hearing aid (HA) further comprises a noise reduction controller (NR-CTR) configured to determine a local set of noise reduction parameters (LG), e.g. gains, to be applied to the electric input signals of the hearing aid (or to a signal or signals originating therefrom, e.g. a beamformed signal). The local set of noise reduction parameters (LG) may e.g. be dependent on the electric input signals (X1, X2) of the hearing aid (HA) and optionally one or more detectors, e.g. a voice activity detector. The hearing aid (HA) further comprises a data receiver (RX) configured to receive data via a communication link (LNK) from the external processing device (EPD).

The exemplary hearing aid (HA) of FIG. 10 further comprises a hearing aid processor (PRO) for processing the noise reduced signal (YN) from the noise reduction system (NRS) of the hearing aid (HA). The hearing aid processor (PRO) may e.g. be configured to apply one or more processing algorithms to the noise reduced signal (YN) to compensate for a hearing impairment of the user. The processed output signal (OUT) from the hearing aid processor (PRO) is provided to an output unit (OU) of the hearing aid (HA). The output unit (OU) may e.g. comprise a synthesis filter bank, cf. FB-S in FIG. 6 (for converting the processed output signal (OUT) in the (time-)frequency domain to a signal in the time-domain) and an output transducer, e.g. a loudspeaker (SPK as in FIG. 6) and/or a vibrator of a bone conduction hearing aid.

The external processing device (EPD) comprises at least one input transducer (MX), here one microphone) for providing at least one electric input signal (xx) representing sound in the environment of the external processing device (EPD). The microphone path of the input transducer may comprise an analysis filter bank for providing the electric input signal (XX) in a time-frequency representation (k,l). The external processing device (EPD) further comprises a parameter estimator (G-EST) for providing an external set of noise reduction parameters (XG), e.g. gains, configured to reduce noise in the at least one EPD-electric input signal (XX), or in the at least one HA-electric input signal (X1, X2), or in a signal originating therefrom. The external processing device (EPD) further comprises a signal quality estimator (SQX) configured to estimate a signal quality parameter (SQX-E) of the at least one electric input signal (xx) from the input transducer (MX) of the external processing device (EPD). The signal quality parameter (SQE-X) may e.g. be constituted by or comprise a signal to noise ratio (SNR), or a level (L), a voice activity parameter (e.g. a speech presence probability (SPP)), or a bit error rate (BER), or similar (equivalent) parameters. The external processing device (EPD) further comprises a data transmitter (TX) configured to transmit data, including the external set of noise reduction parameters (XG) and the signal quality parameter (SQE-X), via the communication link (LNK) to a receiver (Rx) of the hearing aid (HA). The communication link (LNK) may e.g. be a wireless link, e.g. based on Bluetooth or Bluetooth Low-Energy (BLE), e.g. Bluetooth LE Audio (or functionally similar, standardized or proprietary, technology).

The embodiment of a configurable noise reduction system (NRS) of the hearing aid shown in FIG. 10 comprises a beamformer (BF) for providing a beamformed (spatially filtered) signal ($Y_{BF}$) as a liner combination of the electric input signals (X1, X2) from the input unit (IU). The electric input signals (X1, X2) er provided by the input unit (IU) (originating from first and second input transducers and transformed into a time-frequency representation (k, l) by respective analysis filter banks). The configurable noise reduction system (NRS) further comprises a post-filter (PF) receiving the beamformed signal ($Y_{BF}$). The post-filter is configured to further reduce noise in the beamformed signal ($Y_{BF}$) in dependence of post-filter gains (RG). The (resulting) post-filter gains (RG) are either A) estimated based on the electric input signals of the hearing aid, and termed 'local post-filter gains' (LG), or B) estimated based on the electric input signal (or signals) of the external processing device, and termed 'external post-filter gains' (XG), or C) a combination (mixture, e.g. a weighted combination) thereof. The local post-filter gains (cf. signals (LG)) are determined in the noise reduction controller (NR-CTR), specifically in the local gain estimator (LOCG) in FIG. 10, e.g. (further) in dependence of the outputs of one or more target cancelling beamformers, whose beamformer weights are e.g. fixed or updated during use, e.g. using a voice activity detector, as is known in the art (see e.g. EP2701145A1).

An embodiment of the noise reduction controller (NR-CTR) as shown in FIG. 10 will be described in further detail in the following.

The noise reduction controller (NR-CTR) receives as inputs:

From the hearing aid (HA), a) the electric input signals (X1, X2) from the input unit (IU); and from the external processing device (EPD) via the data communication link (LNK), b) the external post-filter gains (XG) (termed XG* in the hearing aid after reception in the receiver (RX)), and c) the signal quality parameter (SQE-X) ((termed SQE-X* in the hearing aid) representative of the signal quality of the at least one electric input signal (xx) from the input transducer (MX) of the external processing device (EPD).

The noise reduction controller (NR-CTR) of the hearing aid (HA), cf. dotted enclosure denoted NR-CTR in FIG. 10, is configured to determine the resulting set of noise reduction parameters (RG) in dependence of a noise reduction control signal (NRC). As exemplified in FIG. 10 and mentioned above, the noise reduction controller (NR-CTR) comprises local gain estimator (LOCG) for providing the gains (LG) of local origin and a signal quality estimator (SQL) configured to estimate a signal quality parameter (SQE-L) of the at least one electric input signal (X1, X2), e.g. either one of them, or both or a logic combination of them (e.g. an average) from the input unit (IU) of the hearing aid (HA). The noise reduction controller (NR-CTR) further comprises a comparator (COMP) configured to compare the locally estimated signal quality parameter (SQE-L) and the externally estimated signal quality parameter (SQE-X*) received from the external processing device (EPD). Based on the two signal quality parameters, the comparator (COMP) is configured to provide the noise reduction control signal (NRC). If a difference, ASQE (or ratio, SQE-L/SQE-X*) between the local signal quality parameter (SQE-L) and the externally estimated signal quality parameter (SQE-X*) is larger than a threshold value (SQEm) (indicating that the signal quality of the electric inputs signals of the hearing aid (or of a signal originating therefrom) is (much) larger than the signal quality of the electric input signal(s) of the external processing device), the noise reduction control signal (NRC) may be configured to choose the gains (LG) of local origin as the resulting gains (RG). This choice is made by the decision unit (DECI) which provides the resulting gains (RG) in dependence of the local gains (LG) and the external gains (XG*) controlled by the noise reduction control signal (NRC). If a difference, ASQE (or ratio, SQE-L/SQE-X*) between the local signal quality parameter (SQE-L) and the externally estimated signal quality parameter (SQE-X*) is smaller than a threshold value (SQEm), the noise reduction control signal (NRC) may be configured (via the decision unit (DECI)) to choose the gains (XG*) of external origin as the resulting gains (RG). If e.g. the difference, ASQE (or ratio, SQE-L/SQE-X*) between the local signal quality parameter (SQE-L) and the externally estimated signal quality parameter (SQE-X*) is smaller than a first threshold value ($SQE_{TH1}$) and larger than a second threshold value ($SQE_{TH2}$), the noise reduction control signal (NRC) may be configured (via the decision unit (DECI)) to choose a combination, e.g. a weighted combination, of the local gains (LG) and the external gains (XG*). The weights of a given weighted combination may be frequency dependent and may depend on the respective signal quality parameters (SQE-L, SQE-X*) of the at least one HA-electric input signal and the at least one EPD-electric input signal. The resulting, combined, (frequency (k) dependent) resulting gains $RG(k)=LG(k)W_{HA}(k)+XG^*(k)W_{EPD}(k)$, where the individual (e.g. frequency dependent) weights $W_{HA}(k)$ and $W_{EPD}(k)$ of the hearing aid and the external processing device, respectively, may be adapted to scale with their signal quality parameters $SQP_{HA}(k)$ (=SQE-L) and $SQP_{EPD}(k)$ (=SQE-X*), respectively ('scale with' in the meaning 'larger the larger' and 'smaller the smaller'). The signal quality parameters may e.g. be or comprise a signal to noise ratio (SNR) or a speech presence probability (SPP), or a speech intelligibility (SI) estimate, etc.

The hearing aid (e.g. the receiver RX) may configured to detect whether the external set of noise reduction parameters (XG) are received in the hearing aid (HA) from the external processing device (EPD), and to provide a reception control signal (RxC) representative thereof (cf. dashed arrow from receiver (RX)) to decision unit (DECI)). The noise reduction controller (NR-CTR) is configured to base the resulting set of noise reduction parameters (RG) solely on the local set of noise reduction parameters (LG) in case no noise reduction parameters (XG) are received in the hearing aid from the external processing device as indicated by the reception control signal (RxC).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP2701145A1 (Oticon) Feb. 26, 2014.
EP3253075A1 (Oticon) Dec. 6, 2017.
EP4099724A1 (Oticon) Dec. 7, 2022.
EP3252766A1 (Oticon) Dec. 6, 2017.
EP3694229A1 (Oticon) Aug. 12, 2020.

The invention claimed is:

1. A hearing system comprising at least one hearing aid (HA) configured to be worn by a user at or in an ear of the user, and an external, portable processing device (EPD);

the at least one hearing aid comprising:

at least one HA-input transducer for providing at least one HA-electric input signal representing sound in the environment of the hearing aid;

a configurable noise reduction system for reducing noise in the at least one HA-electric input signal or in a signal originating therefrom based on a resulting set of noise reduction parameters;

a noise reduction controller configured to determine a local set of noise reduction parameters;

a data receiver configured to receive data via a communication link from the external processing device;

the external processing device comprising;

at least one EPD-input transducer for providing at least one EPD-electric input signal representing sound in the environment of the external processing device;

a parameter estimator for providing an external set of noise reduction parameters configured to reduce noise in the at least one EPD-electric input signal, or in the at least one HA-electric input signal, or in a signal originating therefrom;

a data transmitter configured to transmit data, including said external set of noise reduction parameters, via said communication link to the hearing aid, wherein said noise reduction controller is configured to determine said resulting set of noise reduction parameters based on said local set of noise reduction parameters, or on said external set of noise reduction parameters, or on a mixture thereof, in dependence of a noise reduction control signal, a signal quality estimator or separate signal quality estimators configured to estimate an external signal quality parameter of the at least one EPD-electric input signal, or a signal originating therefrom, and a local signal quality parameter of the at least one HA-electric input signal, or of a signal originating therefrom, a comparator configured to compare the local signal quality parameter with the external signal quality parameter provided by the signal quality estimators, and wherein the comparator is configured to provide the noise reduction control signal in dependence thereof.

2. A hearing system according to claim 1 wherein the noise reduction controller is configured to determine the noise reduction control signal in dependence of the signal quality parameter of the at least one EPD-electric input signal, and/or of the at least one HA-electric input signal, or in a signal originating therefrom.

3. A hearing system according to claim 1 wherein the signal quality parameter of the HA- or EPD-electric input signals comprises one or more of a signal to noise ratio, a level, a voice activity parameter, a speech intelligibility indicator, and a bit error rate.

4. A hearing system according to claim 1 wherein the hearing aid is configured to detect whether said external set of noise reduction parameters are received in the hearing aid from the external processing device, and to provide a reception control signal representative thereof.

5. A hearing system according to claim 4 wherein the noise reduction controller is configured to base the resulting set of noise reduction parameters solely on the local set of noise reduction parameters in case no noise reduction parameters are received in the hearing aid from the external processing device as indicated by said reception control signal.

6. A hearing system according to claim 1 configured to base the resulting set of noise reduction parameters on a mixture of the local and external set of noise reduction parameters provided as a weighted combination of the local set of noise reduction parameters and the external set of noise reduction parameters, wherein the weights of a given weighted combination depend on the respective local and external signal quality parameters (SQE-L, SQE-X) of the at least one HA-electric input signal and the at least one EPD-electric input signal.

7. A hearing system according to claim 6 wherein the individual weights of the hearing aid and the external processing device are adapted to scale with their respective signal quality parameters, respectively.

8. A hearing system according to claim 1 comprising a sound scene classifier for classifying an acoustic environment around the hearing system and providing a sound scene classification signal representative of a current acoustic environment around the hearing system.

9. A hearing system according to claim 8, wherein the sound scene classification signal is representative of an estimate of the complexity of the current sound scene.

10. A hearing system according to claim 1 configured to control the communication link to allow enabling/disabling the transmission of data by the external processing device, or reception of data by the hearing aid, in dependence of a link control signal.

11. A hearing system according to claim 10, wherein the hearing system comprises a sound scene classifier for classifying an acoustic environment around the hearing system and providing a sound scene classification signal representative of a current acoustic environment around the hearing system, and wherein the hearing system is configured to control the communication link in dependence of the sound scene classification signal.

12. A hearing system according to claim 1 wherein the parameter estimator of the external processing device comprises a deep neural network.

13. A hearing system according to claim 1 configured to provide a limitation on the noise reduction parameters applied to the at least one HA electric input signal or to a signal originating therefrom by the noise reduction system of the hearing aid.

14. A hearing system according to claim 13, wherein the hearing system comprises a signal quality estimator or separate signal quality estimators configured to estimate an external signal quality parameter of the at least one EPD-electric input signal, or a signal originating therefrom, and a local signal quality parameter of the at least one HA-electric input signal, or of a signal originating therefrom, wherein the maximum amount of noise reduction depends on said signal quality parameter, or wherein the hearing system comprises a sound scene classifier for classifying an acoustic environment around the hearing system and providing a sound scene classification signal representative of a current acoustic environment around the hearing system, wherein the maximum amount of noise reduction depends on said sound scene classification signal.

15. A hearing system according to claim 1 comprising a distance estimator or a delay estimator configured to estimate a distance or a delay, respectively, between the at least one hearing aid and the external processing device.

16. A hearing system according to claim 15 wherein the distance estimator or the delay estimator is configured to estimate the distance or delay, respectively, between the at least one hearing aid and the external processing device in dependence of a correlation between an envelope of the noise reduction parameters provided by the external processing device and an envelope of the at least one HA electric input signal or of a signal originating therefrom.

17. A hearing system according to claim 16 wherein the noise reduction controller is configured to only apply the noise reduction gain estimates provided by the external processing device if a time lag between the respective envelopes is smaller than a threshold-value.

18. A hearing system according to claim 15 wherein the noise reduction control signal is adapted to depend on the estimated delay between the local set of noise reduction parameters and the external set of noise reduction parameters.

19. A hearing system according to claim 1 wherein the external processing device is configured to be worn or carried by the user or a target talker, and/or to be placed on a surface, e.g. a table.

20. A hearing system comprising at least one hearing aid (HA) configured to be worn by a user at or in an ear of the user, and an external, portable processing device (EPD);

the at least one hearing aid comprising:

at least one HA-input transducer for providing at least one HA-electric input signal representing sound in the environment of the hearing aid;

a configurable noise reduction system for reducing noise in the at least one HA-electric input signal or in a signal originating therefrom based on a resulting set of noise reduction parameters;

a noise reduction controller configured to determine a local set of noise reduction parameters;

a data receiver configured to receive data via a communication link from the external processing device;

the external processing device comprising:

at least one EPD-input transducer for providing at least one EPD-electric input signal representing sound in the environment of the external processing device;

a parameter estimator for providing an external set of noise reduction parameters configured to reduce noise in the at least one EPD-electric input signal, or in the at least one HA-electric input signal, or in a signal originating therefrom;

a data transmitter configured to transmit data, including said external set of noise reduction parameters, via said communication link to the hearing aid, wherein said noise reduction controller is configured to determine said resulting set of noise reduction parameters based on said local set of noise reduction parameters, or on said external set of noise reduction parameters, or on a mixture thereof, in dependence of a noise reduction control signal, wherein the hearing system is configured to base the resulting set of noise reduction parameters on a mixture of the local and external set of noise reduction parameters provided as a weighted combination of the local set of noise reduction parameters and the external set of noise reduction parameters, wherein the weights of a given weighted combination depend on the respective local and external signal quality parameters (SQE-L, SQE-X) of the at least one HA-electric input signal and the at least one EPD-electric input signal.

21. A hearing system comprising at least one hearing aid (HA) configured to be worn by a user at or in an ear of the user, and an external, portable processing device (EPD);

the at least one hearing aid comprising:

at least one HA-input transducer for providing at least one HA-electric input signal representing sound in the environment of the hearing aid;

a configurable noise reduction system for reducing noise in the at least one HA-electric input signal or in a signal originating therefrom based on a resulting set of noise reduction parameters;

a noise reduction controller configured to determine a local set of noise reduction parameters;

a data receiver configured to receive data via a communication link from the external processing device;

the external processing device comprising:

at least one EPD-input transducer for providing at least one EPD-electric input signal representing sound in the environment of the external processing device;

a parameter estimator for providing an external set of noise reduction parameters configured to reduce noise in the at least one EPD-electric input signal, or in the at least one HA-electric input signal, or in a signal originating therefrom;

a data transmitter configured to transmit data, including said external set of noise reduction parameters, via said communication link to the hearing aid, a distance estimator or a delay estimator configured to estimate a distance or a delay, respectively, between the at least one hearing aid and the external processing device, wherein the distance estimator or the delay estimator is configured to estimate the distance or delay, respectively, between the at least one hearing aid and the external processing device in dependence of a correlation between an envelope of the noise reduction parameters provided by the external processing device and an envelope of the at least one HA electric input signal or of a signal originating therefrom.

* * * * *